United States Patent
Park et al.

(10) Patent No.: US 9,851,595 B2
(45) Date of Patent: Dec. 26, 2017

(54) DISPLAY DEVICE AND MANUFACTURING METHOD THEREOF

(71) Applicant: SAMSUNG DISPLAY CO., LTD., Yongin-si, Gyeonggi-do (KR)

(72) Inventors: Choi Sang Park, Suwon-si (KR); Seong Gyu Kwon, Suwon-si (KR); Tae Woo Lim, Yongin-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/204,913

(22) Filed: Jul. 7, 2016

(65) Prior Publication Data

US 2017/0199418 A1  Jul. 13, 2017

(30) Foreign Application Priority Data

Jan. 7, 2016 (KR) .................. 10-2016-0001934

(51) Int. Cl.
*G02F 1/1339* (2006.01)
*G02F 1/1333* (2006.01)
*G02F 1/1335* (2006.01)
*G02F 1/1341* (2006.01)
*G02F 1/1343* (2006.01)
*G02F 1/1345* (2006.01)
(Continued)

(52) U.S. Cl.
CPC ...... *G02F 1/133377* (2013.01); *G02F 1/1341* (2013.01); *G02F 1/1368* (2013.01); *G02F 1/13439* (2013.01); *G02F 1/13458* (2013.01); *G02F 1/133345* (2013.01); *G02F 1/133512* (2013.01); *G02F 1/133514* (2013.01);
(Continued)

(58) Field of Classification Search
CPC ......... G02F 1/133377; G02F 1/136286; G02F 1/133528; G02F 1/1368; G02F 1/133512; G02F 1/1341; G02F 1/13458; G02F 1/133345; G02F 1/134309; G02F 1/13439;
(Continued)

(56) References Cited

U.S. PATENT DOCUMENTS

2005/0117093 A1* 6/2005 Kim .................. G02F 1/133514
349/106
2013/0342779 A1* 12/2013 Jung .................... G02B 6/0083
349/43
(Continued)

FOREIGN PATENT DOCUMENTS

KR 10-0741057 B1 7/2007
KR 10-2012-0014789 A 2/2012
(Continued)

OTHER PUBLICATIONS

Extended European Search Report for EP Patent Application No. 16188536.3, dated Mar. 24, 2017.

*Primary Examiner* — Donald Raleigh
(74) *Attorney, Agent, or Firm* — Innovation Counsel LLP

(57) ABSTRACT

A display device according to an exemplary embodiment includes: a substrate including a display area and a peripheral area; a thin film transistor positioned in the display area of the substrate; a first electrode connected to the thin film transistor; a roof layer positioned on the first electrode and spaced apart from the first electrode by a microcavity that is interposed between the roof layer and the first electrode; a liquid crystal layer positioned inside the microcavity; an encapsulation layer positioned on the roof layer; a pad portion positioned in the peripheral area of the substrate; and a pillar positioned in the peripheral area of the substrate.

15 Claims, 21 Drawing Sheets

(51) Int. Cl.
*G02F 1/1362* (2006.01)
*G02F 1/1368* (2006.01)
*G02F 1/1337* (2006.01)

(52) U.S. Cl.
CPC .. *G02F 1/133528* (2013.01); *G02F 1/134309* (2013.01); *G02F 1/136286* (2013.01); *G02F 1/13452* (2013.01); *G02F 1/133707* (2013.01); *G02F 2001/136295* (2013.01); *G02F 2201/121* (2013.01); *G02F 2201/123* (2013.01); *G02F 2202/10* (2013.01)

(58) Field of Classification Search
CPC ......... G02F 1/133514; G02F 2201/123; G02F 2001/13629
See application file for complete search history.

(56) References Cited

U.S. PATENT DOCUMENTS

2015/0055074 A1* 2/2015 Lee .................. G02F 1/133345
  349/138
2015/0092131 A1  4/2015 Lee et al.

FOREIGN PATENT DOCUMENTS

| KR | 10-2012-0026880 A | 3/2012 |
| KR | 10-1164120 B1 | 7/2012 |
| KR | 10-2014-0146425 A | 12/2014 |
| KR | 10-2015-0038950 A | 4/2015 |
| KR | 10-2015-0047358 A | 5/2015 |

* cited by examiner

DISPLAY DEVICE AND MANUFACTURING METHOD THEREOF

RELATED APPLICATIONS

This application claims priority to and the benefit of Korean Patent Application No. 10-2016-0001934 filed in the Korean Intellectual Property Office on Jan. 7, 2016, the disclosure of which is incorporated by reference in its entirety.

BACKGROUND

1. Field

The present disclosure relates generally to a display device and a manufacturing method thereof.

2. Description of the Related Art

As one of the most widely used flat panel displays, a liquid crystal display (LCD) includes two sheets of display panels formed with field-generating electrodes and a liquid crystal layer interposed therebetween. The LCD displays an image by generating an electric field in a liquid crystal layer by applying a voltage to the field-generating electrodes, determining alignment directions of liquid crystal molecules of the liquid crystal layer by the generated electric field, and controlling polarization of incident light.

The two sheets of display panels included in the LCD may be a thin film transistor array panel and an opposed display panel. In the thin film transistor array panel, a gate line for transmitting a gate signal and a data line for transmitting a data signal are formed to cross each other. In addition, a thin film transistor connected to the gate and data lines and a pixel electrode connected to the thin film transistor may be formed in the thin film transistor array. A light blocking member, a color filter, a common electrode, and the like may be formed in the opposed display panel or in the thin film transistor array panel.

In conventional LCDs, since two sheets of substrates are required and components are respectively formed on the two sheets of substrates, the display device not only becomes heavy, thick, and costly, but also requires a longer processing time.

The above information disclosed in this Background section is only to enhance the understanding of the background information of the described technology and therefore it may contain information that does not form a prior art that is already known to a person of ordinary skill in the art.

SUMMARY

The present disclosure provides a display device and a manufacturing method thereof that are capable of reducing a thickness, a width, a cost, and a processing time by manufacturing the display device using one substrate.

As such, when the display device is manufactured using one substrate, an encapsulation layer for encapsulating a liquid crystal layer may be formed. In order for a pad portion to be connected to an outside terminal, the pad portion should be formed such that it is not covered by the encapsulation layer.

When the encapsulation layer is partially coated only in the display area, there may be a large area of the encapsulation layer with a slope at starting and ending points of the coating, and such an area cannot be used as the display area, thereby increasing a bezel area.

In addition, when the encapsulation layer is formed across the entire display area and is then patterned to open the pad portion, there is a problem in that the liquid crystal layer positioned inside the display area may be contaminated during a photolithography process.

The present disclosure provides a display device and a manufacturing method thereof that are capable of opening a pad portion without contaminating a liquid crystal layer.

An exemplary embodiment provides a display device, including: a substrate including a display area and a peripheral area; a thin film transistor positioned in the display area of the substrate; a first electrode connected to the thin film transistor; a roof layer positioned on the first electrode and spaced apart from the first electrode by a microcavity that is interposed between the roof layer and the first electrode; a liquid crystal layer positioned inside the microcavity; an encapsulation layer positioned on the roof layer; a pad portion positioned in the peripheral area of the substrate; and a pillar positioned in the peripheral area of the substrate.

The pillar may include a first layer that is made of the same material as the roof layer.

The display device may further include an insulating layer positioned under the roof layer, wherein the pillar may further include a second layer that is made of the same material as the insulating layer.

The display device may further include a second electrode positioned between the roof layer and the liquid crystal layer, wherein the pillar may further include a third layer that is made of the same material as the second electrode.

The pillar may be formed by laminating the third layer, the second layer, and the first layer.

The display device may further include a second electrode and an interlayer insulating layer interposed between the first electrode and the second electrode, wherein the liquid crystal layer may be positioned on the second electrode.

The display device may further include an insulating layer positioned under the roof layer, wherein the pillar may include a first layer that is made of the same material as the roof layer, and a second layer that is positioned under the first layer and is made of the same material as the insulating layer.

The display device may further include a gate line and a data line connected to the thin film transistor, a gate pad positioned in the peripheral area of the substrate and connected to the gate line, a gate contact assistant positioned on the gate pad, a data pad positioned in the peripheral area of the substrate and connected to the data line, and a data contact assistant positioned on the data pad.

A side surface of the encapsulation layer may include a heat-deformable portion.

A manufacturing method of a display device according to an exemplary embodiment may include: forming a thin film transistor on a display area of a substrate including a display area, a peripheral area, and an extra area; forming a first electrode to be connected to the thin film transistor; forming a sacrificial layer on the first electrode; forming a roof layer on the sacrificial layer; forming a microcavity between the first electrode and the roof layer by removing the sacrificial layer, forming an encapsulation layer on the roof layer; cutting the encapsulation layer positioned on a boundary between the display area and peripheral area of the substrate; cutting a boundary between the peripheral area and extra area of the substrate; and removing the encapsulation layer positioned in the peripheral area and extra area of the substrate, and the extra area of the substrate.

The manufacturing method may further include forming a gate line on the substrate, and forming a data line on the substrate, wherein the gate line and the data line may be connected to the thin film transistor.

The manufacturing method may further include forming, in the peripheral area of the substrate, a gate pad portion connected to the gate line, and forming, in the peripheral area of the substrate, a data pad portion connected to the data line.

The manufacturing method may further include forming the sacrificial layer on the gate pad portion and the data pad portion, and forming a dummy microcavity.

The manufacturing method may further include removing the dummy microcavity, and forming a pillar in the peripheral area of the substrate.

The pillar may include a first layer that is made of the same material as the roof layer.

The manufacturing method may further include forming a second electrode on the sacrificial layer; and forming an insulating layer on the second electrode, wherein the pillar further includes a second layer that is positioned under the first layer and is made of the same material as the insulating layer, and a third layer that is positioned under the second layer and is made of the same material as the second electrode.

The manufacturing method may further include forming a second electrode; and forming an interlayer insulating layer interposed between the first electrode and the second electrode; and forming an insulating layer on the sacrificial layer, wherein the pillar further may include a second layer that is positioned under the first layer and is made of the same material as the insulating layer.

The forming of the gate pad portion may include forming a gate pad extended from an end portion of the gate line, and forming a gate contact assistant on the gate pad.

The gate pad is made of the same material as the gate line, and the gate contact assistant may be made of the same material as the first electrode.

The forming of the data pad portion may include forming a data pad extended from an end portion of the data line, and forming a data contact assistant on the data pad.

The data pad may be made of the same material as the data line, and the data contact assistant may be made of the same material as the first electrode.

The manufacturing method may further include irradiating a laser to the encapsulation layer positioned on a boundary between the display area and peripheral area of the substrate to cut the encapsulation layer.

A region to which a laser is irradiated may not overlap the gate pad portion or the data pad portion.

A side surface of the encapsulation layer may include a heat-deformable portion.

The display device and the manufacturing method thereof according to the current exemplary embodiment as described above have the following effects.

According to the current exemplary embodiment, since the display device is manufactured using one substrate, the weight, thickness, cost, and processing time thereof can be reduced.

In addition, after forming the dummy microcavity in the peripheral area, the encapsulation layer and the substrate can be removed using a laser cutting process to open the pad portion, thereby preventing contamination of the liquid crystal layer.

DETAILED DESCRIPTION

Figure 1:
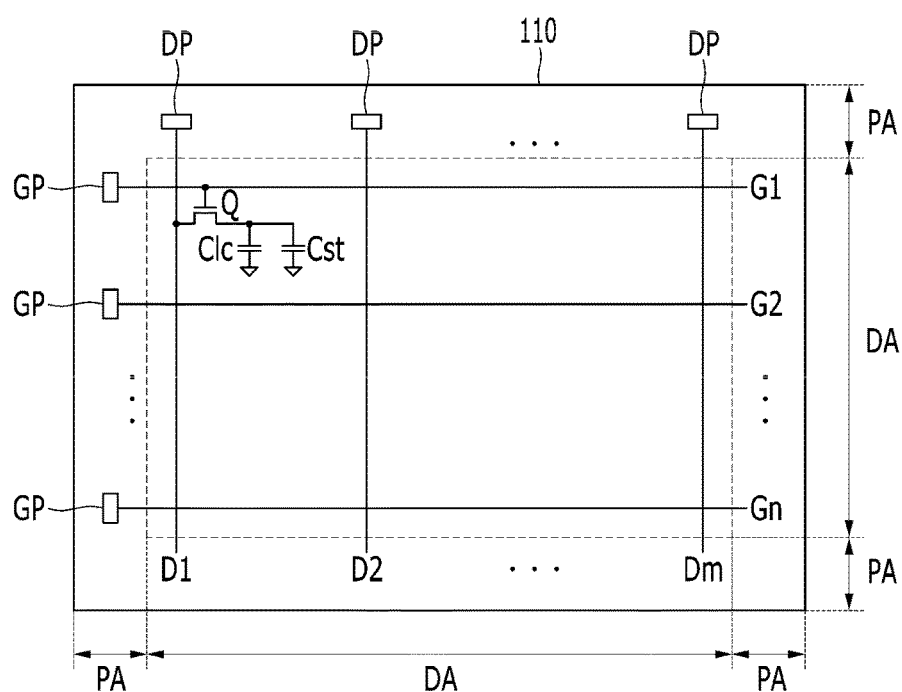
FIG. 1 is a top plan view of a display device, according to an exemplary embodiment.

The present disclosure will be described more fully hereinafter with reference to the accompanying drawings, in which exemplary embodiments of the present disclosure are shown. As those skilled in the art would realize, the described embodiments may be modified in various different ways, without departing from the spirit or scope of the present disclosure.

In the drawings, the thickness of layers, films, panels, regions, etc. may be exaggerated for clarity. Like reference numerals designate like elements throughout the specification. It will be understood that when an element such as a layer, film, region, or substrate is referred to as being "on" another element, it can be directly on the other element or one or more intervening elements may also be present. In contrast, when an element is referred to as being "directly on" another element, there may be no intervening elements present.

Referring first to FIG. 1, a display device according to an exemplary embodiment will be described as follows.

FIG. 1 is a top plan view of a display device, according to an exemplary embodiment. The display device includes a substrate 110 that is made of a material such as glass or plastic.

The substrate 110 is divided into a display area DA and a peripheral area PA. The display area DA is positioned in a center part of the substrate 110, and the peripheral area PA surrounds an edge of the display area DA. The display area DA is an area on which an image is displayed, and drivers for transmitting driving signals are positioned in the peripheral area PA to allow the image to be displayed in the display area DA.

In the display area DA, a plurality of gate lines G1 to Gn are formed to be parallel to each other, and a plurality of data lines D1 to Dm are formed to be parallel to each other. The plurality of gate lines G1 to Gn and the plurality of data lines D1 to Dm are insulated from each other, and cross each other to define a plurality of pixels.

In each pixel, a thin film transistor Q an LC capacitor Clc, and a storage capacitor Cst are formed. A control terminal of the thin film transistor Q is connected to any one of the plurality of gate lines G1 to Gn, an input terminal thereof is connected to any one of the plurality of data lines D1 to Dm, and an output terminal thereof is connected to one terminal of the LC capacitor Clc and one terminal of the storage capacitor Cst. A common voltage may be applied to the other terminal of the LC capacitor Clc, and a reference voltage may be applied to the other terminal of the storage capacitor Cst.

The gate lines G1 to Gn and the data lines D1 to Dm are extended to the peripheral area PA. In the peripheral area PA, gate pad portions GP connected to the gate lines G1 to Gn are positioned, and data pad portions DP connected to the data lines D1 to Dm are positioned. The gate pad portions GP may be connected to an outside terminal, and receive a gate signal from a gate driver to transmit the gate signal to the gate lines G1 to Gn. The data pad portions DP may be connected to an outside terminal, and receive a data signal from a data driver to transmit the data signal to the data lines D1 to Dm.

In FIG. 1, the gate pad portions GP are illustrated to be positioned at a left edge of the display area DA, but the present disclosure is not limited thereto, and the position of the gate pad portions GP may be variously changed. Alternatively, the gate pad portions GP may be positioned at opposite lateral edges of the display area DA.

In FIG. 1, the data pad portions DP are illustrated to be positioned at an upper edge of the display area DA, but the present disclosure is not limited thereto, and the position of the data pad portions DP may be variously changed. Alternatively, the data pad portion DP may be positioned at both lateral edges of the display area DA.

Structures of one pixel and pad portions of a display device according to an exemplary embodiment will now be described with reference to FIGS. 2 to 4.

Figure 2:
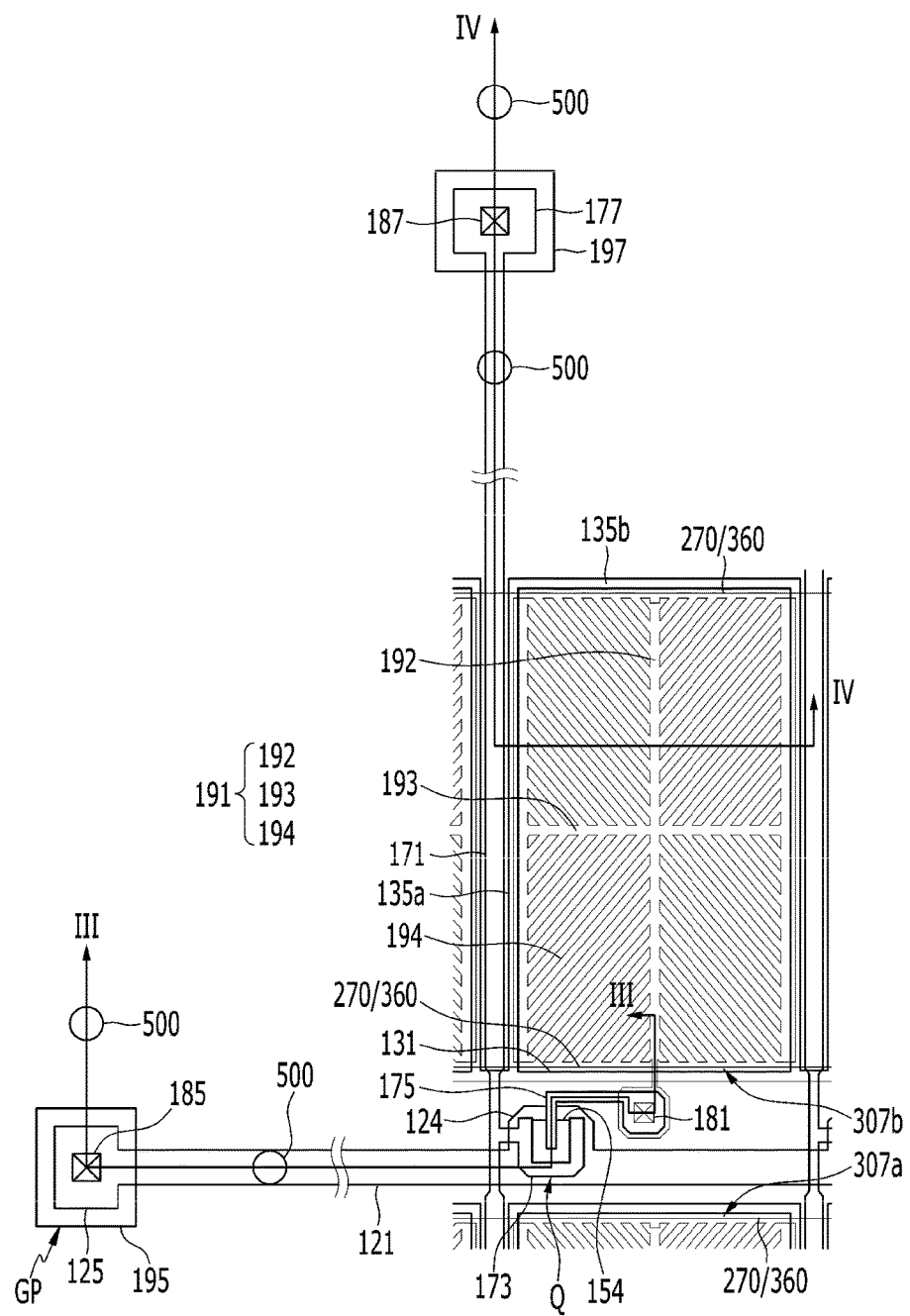
FIG. 2 is a partial top plan view of a display device, according to an exemplary embodiment.

FIG. 2 is a partial top plan view of a display device according to an exemplary embodiment. FIG. 3 is a cross-sectional view of the display device taken along the line III-III of FIG. 2. FIG. 4 is a cross-sectional view of the display device taken along the line IV-IV of FIG. 2.

Figure 3:
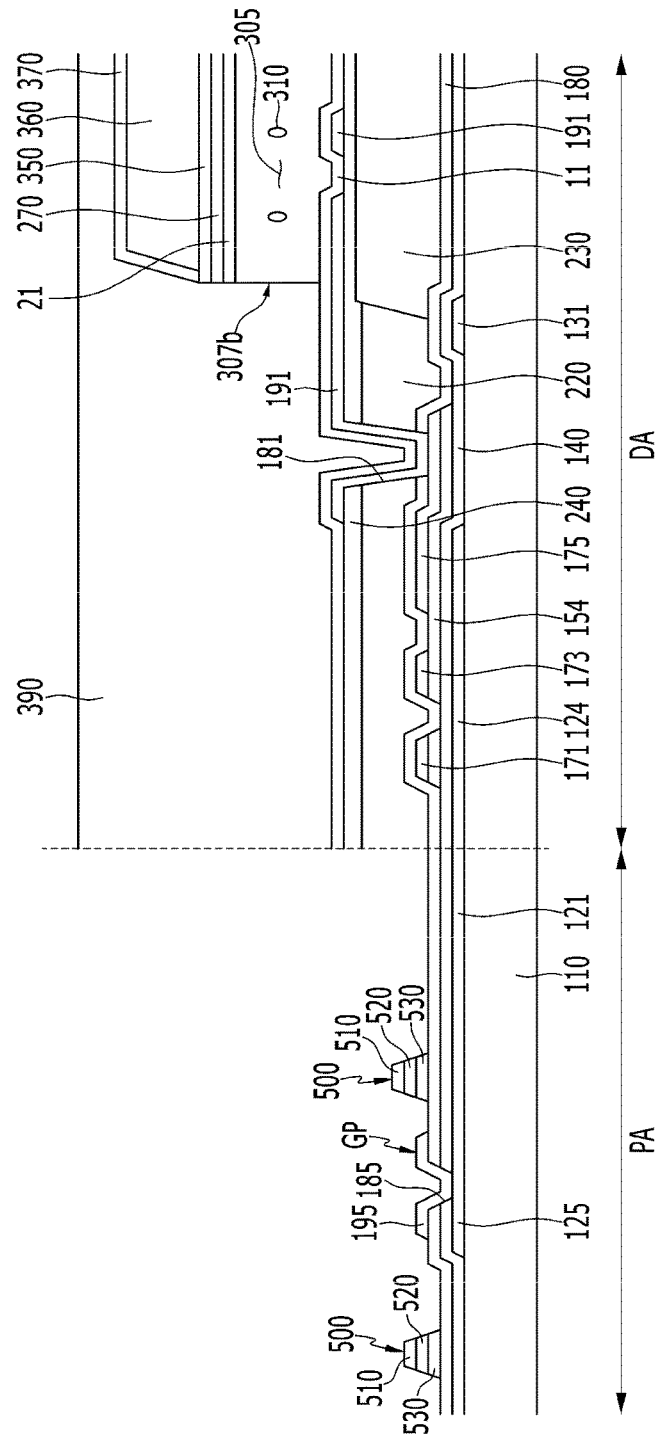
FIG. 3 is a cross-sectional view of a display device taken along the line III-III of FIG. 2.
Figure 4:
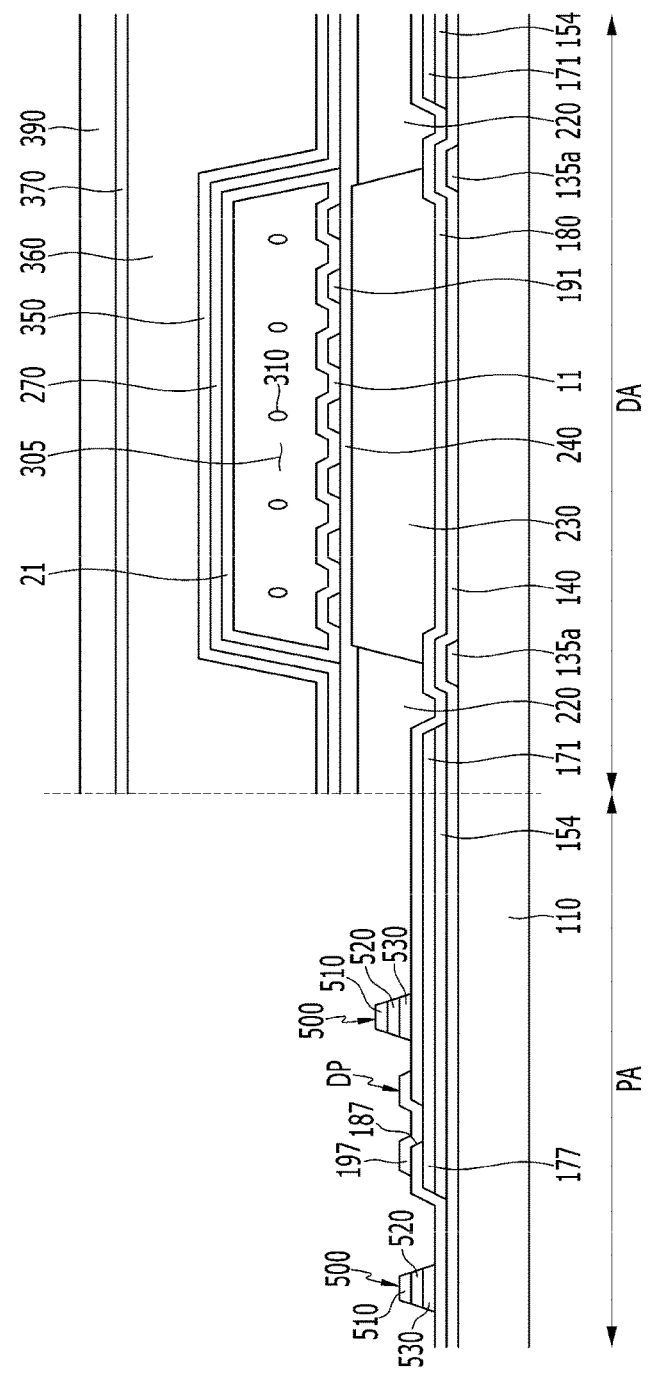
FIG. 4 is a cross-sectional view of a display device taken along the line IV-IV of FIG. 2.

Referring to FIGS. 2 to 4, a gate line 121, a gate electrode 124 protruding from the gate line 121, and a gate pad 125 connected to the gate line 121 are positioned on a substrate 110. The gate line 121 extends in a first direction and transmits a gate signal. For example, the gate line 121 may extend in a substantially horizontal direction. In the top plan view, the gate electrode 124 protrudes upward of the gate line 121. However, the present disclosure is not limited thereto, and a protruding shape and direction of the gate electrode 124 may be variously modified. Alternatively, the gate electrode 124 may not protrude from the gate line 121, and may be disposed on the gate line 121. The gate line 121 and the gate electrode 124 are positioned in the display area DA, and the gate line 121 is extended to the peripheral area PA.

The gate pad 125 is extended from an end portion of the gate line 121. The end portion of the gate line 121 is positioned in the peripheral area PA, and the gate pad 125 is positioned in the peripheral area PA. The gate pad 125 may have a wider width than the gate line 121. The gate pad 125 may be made of the same material as the gate line 121 and the gate electrode 124, and may be disposed on the same layer.

A reference voltage line 131 and storage electrodes 135a and 135b protruding from the reference voltage line 131 may be further formed on the substrate 110. The reference voltage line 131 extends in a direction parallel to the gate line 121, and is spaced apart from the gate line 121. A constant voltage may be applied to the reference voltage line 131. The storage electrodes 135a and 135b include a pair of first storage electrodes 135a extending substantially perpendicular to the reference voltage line 131, and a second storage electrode 135b extending substantially parallel to the reference voltage line 131 and connecting a pair of first storage electrodes 135a. The reference voltage line 131 and the storage electrodes 135a and 135b may surround a pixel electrode 191.

A gate insulating layer 140 is formed on the gate line 121, the gate electrode 124, the gate pad 125, the reference voltage line 131, and the storage electrodes 135a and 135b. The gate insulating layer 140 may be made of an inorganic insulating material such as a silicon nitride (SiNx) and a silicon oxide (SiOx). In addition, the gate insulating layer 140 may include a single layer or multiple layers.

A semiconductor 154 is formed on the gate insulating layer 140. The semiconductor 154 may be disposed on the gate electrode 124. The semiconductor 154 may be made of amorphous silicon, polycrystalline silicon, or a metal oxide.

An ohmic contact member (not shown) may be disposed on the semiconductor 154. The ohmic contact member may be made of a silicide or a material such as n+hydrogenated amorphous silicon in which an n-type impurity is doped at a high concentration.

A data line 171, a source electrode 173, a drain electrode 175, and a data pad 177 are formed on the semiconductor 154 and the gate insulating layer 140. The data line 171 transmits a data signal and extends in a second direction to cross the gate line 121 and the reference voltage line 131. For example, the data line 171 may extend in a substantially vertical direction. The source electrode 173 protrudes above the gate electrode 124 from the data line 171, and may be bent in a U-shape. The drain electrode 175 includes a wide end portion and a rod-shaped end portion. The wide end portion of the drain electrode 175 overlaps the pixel electrode 191. The rod-shaped end portion of the drain electrode 175 is partially surrounded by the source electrode 173. However, the present disclosure is not limited thereto, and shapes of the source electrode 173 and the drain electrode 175 may be variously modified. The data line 171, the source electrode 173, and the drain electrode 175 are positioned in the display area DA, and the data line 171 is extended to the peripheral area PA.

The data pad 177 is connected to the data line 171. The data pad 177 is extended from an end portion of the data line 171. The end portion of the data line 171 is positioned in the peripheral area PA, and the data pad 177 is positioned in the peripheral area PA. The data pad 177 may have a wider width than the data line 171. The data pad 177 may be made of the same material as and disposed on the same layer as the data line 171, the source electrode 173, and the drain electrode 175.

The gate electrode 124, the source electrode 173, and the drain electrode 175 form one thin film transistor (TFT) Q along with the semiconductor 154. In this case, a channel of the thin film transistor Q is formed in the semiconductor 154 between the source electrode 173 and the drain electrode 175.

A passivation layer 180 is formed on the data line 171, the source electrode 173, the drain electrode 175, the semiconductor 154 exposed between the source electrode 173 and the drain electrode 175, and the data pad 177. The passivation layer 180 may be made of an organic insulating material or an inorganic insulating material, and may include a single layer or multiple layers.

On the passivation layer 180, color filters 230 are formed inside each pixel. Each color filter 230 may display one of three primary colors such as red, green, and blue. The color filter 230 may not be limited to displaying the three primary colors such as red, green, and blue, but may display cyan, magenta, yellow, and white-based colors.

A light blocking member 220 is formed between adjacent color filters 230. The light blocking member 220 may be positioned at an edge of the pixel, and may overlap the gate line 121, the data line 171, and the thin film transistor Q to prevent light leakage. However, the present disclosure is not limited thereto, and the light blocking member 220 may overlap the gate line 121 and the thin film transistor Q, but not the data line 171. In this case, in order to prevent light leakage, the adjacent color filters 230 may overlap each other in a portion where the light blocking member 220 overlaps the data line 171. The color filter 230 and the light blocking member 220 may overlap each other in some regions.

A first insulating layer 240 may be formed on the color filter 230 and the light blocking member 220. The first insulating layer 240 may be made of an organic insulating material, and may serve to planarize top surfaces of the color filter 230 and the light blocking member 220. The first insulating layer 240 may be a dual layer that includes a layer made of an organic insulating material and a layer made of an inorganic insulating material. Alternatively, the first insulating layer 240 may be omitted in some embodiments.

A first contact hole 181 exposing at least a portion of the drain electrode 175 is formed in the first insulating layer 240, the light blocking member 220, and the passivation layer 180. The first contact hole 181 may expose the wide end portion of the drain electrode 175. In addition, a second contact hole 185 exposing at least a portion of the gate pad 125 is formed in the passivation layer 180 and the gate insulating layer 140, and a third contact hole 187 exposing at least a portion of the data pad 177 is formed in the passivation layer 180.

The pixel electrode 191 is formed on the first insulating layer 240. The pixel electrode 191 may be made of a transparent metal oxide such as an indium tin oxide (ITO) or an indium zinc oxide (IZO). The pixel electrode 191 is connected to the drain electrode 175 through the first contact hole 181. When the thin film transistor Q is turned on, a data voltage is applied to the drain electrode 175 through the pixel electrode 191.

The pixel electrode 191 includes a horizontal stem portion 193, a vertical stem portion 192, and a minute branch portion 194 extending from the vertical and horizontal stem portions 193 and 192. The pixel electrode 191 is divided into four subregions by the horizontal stem portion 193 and the vertical stem portion 192. The minute branch portion 194 obliquely extends from the horizontal stem portion 193 and the vertical stem portion 192, and may form an angle of about 45° or about 135° with an extending direction of the gate line 121 or the horizontal stem portion 193. In addition, extending directions of the minute branch portions 194 of the two adjacent subregions may be perpendicular to each other. In the current exemplary embodiment, the pixel electrode 191 may further include an outer stem portion that surrounds an outer edge of the pixel.

In addition, a gate contact assistant 195 and a data contact assistant 197 are positioned in the peripheral area PA of the substrate 110. The gate contact assistant 195 and the data contact assistant 197 may be disposed on the passivation layer 180. The gate contact assistant 195 is connected to the gate pad 125 through the second contact hole 185. The gate contact assistant 195 may be made of the same material as and disposed on the same layer as the pixel electrode 191. The gate pad 125 and the gate contact assistant 195 are laminated to form a gate pad portion GP. The data contact assistant 197 is connected to the data pad 177 through the third contact hole 187. The data contact assistant 197 may be made of the same material as and disposed on the same layer as the pixel electrode 191. The data pad 177 and the data contact assistant 197 are laminated to form a data pad portion DP. The pixel electrode 191 may be positioned in the display area DA, and the gate contact assistant 195 and the data contact assistant 197 may be positioned in the peripheral area PA.

The layout of the pixel, the structure of the thin film transistor, and the shape of the pixel electrode described above are merely examples, and the present disclosure is not limited thereto and may be variously modified. For example, one pixel may include a plurality of subpixels to which different voltages are respectively applied. For this purpose, a plurality of thin film transistors may be formed in one pixel.

A common electrode 270 is formed on the pixel electrode 191 to be spaced apart from the pixel electrode 191 by a predetermined distance. A microcavity 305 is formed between the pixel electrode 191 and the common electrode 270. That is, the microcavity 305 is surrounded by the pixel electrode 191 and the common electrode 270. The common electrode 270 may be extended in a row direction. The common electrode 270 covers a top surface and a portion of a side surface of the microcavity 305. A size of the microcavity 305 may be variously modified depending on a size and resolution of the display device.

It is illustrated that a plurality of microcavities 305 are positioned on the substrate 110 and one microcavity 305 corresponds to one pixel. However, the present disclosure is not limited thereto, so the microcavity 305 may correspond to a plurality of pixels, or the microcavity 305 may correspond to the pixel. When one pixel includes two subpixels, the microcavity 305 may correspond to one subpixel. Alternatively, the microcavity 305 may correspond to two subpixels that neighbor each other.

The common electrode 270 may be made of a transparent metal oxide such as an indium tin oxide (ITO) or an indium zinc oxide (IZO). A constant voltage may be applied to the common electrode 270, and an electric field may be generated between the pixel electrode 191 and the common electrode 270.

Alignment layers 11 and 21 are formed on the pixel electrode 191 and under the common electrode 270. The alignment layers 11 and 21 include a first alignment layer 11 and a second alignment layer 21. The first alignment layer 11 and the second alignment layer 21 may be vertical alignment layers, and may be made of an aligning material such as polyamic acid, polysiloxane, or polyimide. The first and second alignment layers 11 and 21 may be connected at a side wall of an edge of the microcavity 305.

The first alignment layer 11 is formed on the pixel electrode 191. The first alignment layer 11 may also be formed directly on the first insulating layer 240 that is not covered by the pixel electrode 191. The second alignment layer 21 is formed under the common electrode 270 to face the first alignment layer 11.

A liquid crystal layer including liquid crystal (LC) molecules 310 is formed inside the microcavity 305 that is positioned between the pixel electrode 191 and the common electrode 270. The LC molecules 310 may have negative dielectric anisotropy, and may be disposed perpendicular to the substrate 110 when no electric field is present.

That is, vertical alignment may be achieved.

The pixel electrode 191 to which the data voltage is applied generates an electric field along with the common electrode 270, thereby determining alignment directions of the LC molecules 310 positioned inside the microcavity 305 between the pixel electrode 191 and the common electrode 270. As such, luminance of light transmitted through the liquid crystal layer varies depending on the determined alignment directions of the LC molecules 310.

A second insulating layer 350 may be formed on the common electrode 270. The second insulating layer 350 may be made of an inorganic insulating material such as a silicon nitride (SiNx) or a silicon oxide (SiOx), and may be omitted in some embodiments.

A roof layer 360 is formed on the second insulating layer 350. The roof layer 360 may be made of an organic material or an inorganic material. In addition, the roof layer 360 may include a single layer or multiple layers. The roof layer 360 may be extended in a row direction. The roof layer 360 covers a top surface of the microcavity 305 and a portion of a side surface of the microcavity 305. The roof layer 360 may be hardened by a curing process to maintain a shape of the microcavity 305. The roof layer 360 is formed to be spaced apart from the pixel electrode 191, and the microcavity 305 is interposed between the pixel electrode 191 and the roof layer 360.

In the drawings, the color filter 230 is illustrated to be positioned under the microcavity 305, but the present disclosure is not limited thereto. The position of the color filter 230 may be changed. For example, the roof layer 360 may be made of a color filter material, and in this case, the color filter 230 may be positioned on the microcavity 305.

A pillar 500 is positioned in the peripheral area PA of the substrate 110. The pillar 500 may be disposed on the passivation layer 180. The pillar 500 may include a single layer or multiple layers. For example, the pillar 500 may include a first layer 510, a second layer 520 positioned under the first layer 510, and a third layer 530 positioned under the second layer 520. The first layer 510 may be made of the same material as and disposed on the same layer as the roof layer 360. The first layer 510 may be thinner than the roof layer 360. The second layer 520 may be made of the same material as and disposed on the same layer as the second insulating layer 350. The third layer 530 may be made of the same material as and disposed on the same layer as the common electrode 270. In some embodiments, the pillar 500 may include only the third layer 530, or may include only the third layer 530 and the second layer 520.

It is illustrated that the pillar 500 does not overlap the gate pad portion GP and the data pad portion DP. However, the present disclosure is not limited thereto, and the pillar 500 may overlap a portion of the gate pad portion GP and the data pad portion DP.

The common electrode 270 and the roof layer 360 do not cover the side surface of the edge of the microcavity 305, and portions of the microcavity 305 that are not covered by the common electrode 270 and the roof layer 360 are referred to as injection openings 307a and 307b. The injection openings 307a and 307b include a first injection opening 307a that exposes a side surface of a first edge of the microcavity 305, and a second injection opening 307b that exposes a side surface of a second edge of the microcavity 305. The first edge and the second edge face each other. For example, in the top plan view, the first edge may be an upper edge of the microcavity 305, and the second edge may be a lower edge of the microcavity 305. In a manufacturing process of the display device, since the microcavity 305 is exposed by the injection openings 307a and 307b, an aligning agent or an LC material may be injected into the microcavity 305 via the injection openings 307a and 307b.

A third insulating layer 370 may be formed on the roof layer 360. The third insulating layer 370 may be made of an inorganic insulating material such as a silicon nitride (SiNx) or a silicon oxide (SiOx). The third insulating layer 370 may be formed to cover a top surface and/or a side surface of the roof layer 360. The third insulating layer 370 may serve to protect the roof layer 360 that is made of an organic material, and may be omitted in some embodiments.

The third insulating layer 370 may have substantially the same planar shape as the roof layer 360. The roof layer 360 may include multiple layers, and in this case, the third insulating layer 370 may correspond to one of multiple layers that constitute the roof layer 360.

An encapsulation layer 390 is formed on the third insulating layer 370. The encapsulation layer 390 is formed to cover the injection openings 307a and 307b that expose a portion of the microcavity 305. That is, the encapsulation layer 390 may encapsulate the microcavity 305 such that the LC molecules 310 positioned inside the microcavity 305 do not leak to the outside. The encapsulation layer 390 may be made of a material that does not react with the LC molecules 310 since it contacts the LC molecules 310. For example, the encapsulation layer 390 may be made of perylene or the like.

The encapsulation layer 390 is positioned in the display area DA, and is not positioned in the peripheral area PA. After the encapsulation layer 390 is formed in both the display area DA and the peripheral area PA, the encapsulation layer 390 positioned in the peripheral area PA may be removed, for example, using a laser. The laser may be irradiated to a boundary between the display area DA and the peripheral area PA. As a result, a side surface of the encapsulation layer 390 may include a heat-deformable portion.

The encapsulation layer 390 may be a multilayer such as a dual layer, a triple layer, or the like. The dual layer includes two layers that are made of different materials. The triple layer includes three layers, in which adjacent layers are respectively made of different materials. For example, the encapsulation layer 390 may include a layer that is made of an organic insulating material and a layer that is made of an inorganic insulating material.

The encapsulation layer 390 is positioned in the display area DA, and is not positioned in the peripheral area PA. Accordingly, the gate pad portion GP and the data pad portion DP may not be covered by the encapsulation layer 390, but may be exposed.

Although not illustrated, a polarizing plate may be further formed at top and bottom surfaces of the display device. The polarizing plate may include a first polarizing plate and a second polarizing plate. The first polarizing plate may be attached to a bottom surface of the substrate 110, and the second polarizing plate may be attached onto the encapsulation layer 390.

Next, with reference to FIG. 5 to FIG. 18, a manufacturing method of a display device will be described as follows. In addition, the description will be made with reference to FIGS. 1 to 4. FIGS. 5 to 18 are process cross-sectional views of a manufacturing method of a display device, according to an exemplary embodiment.

Figure 5:
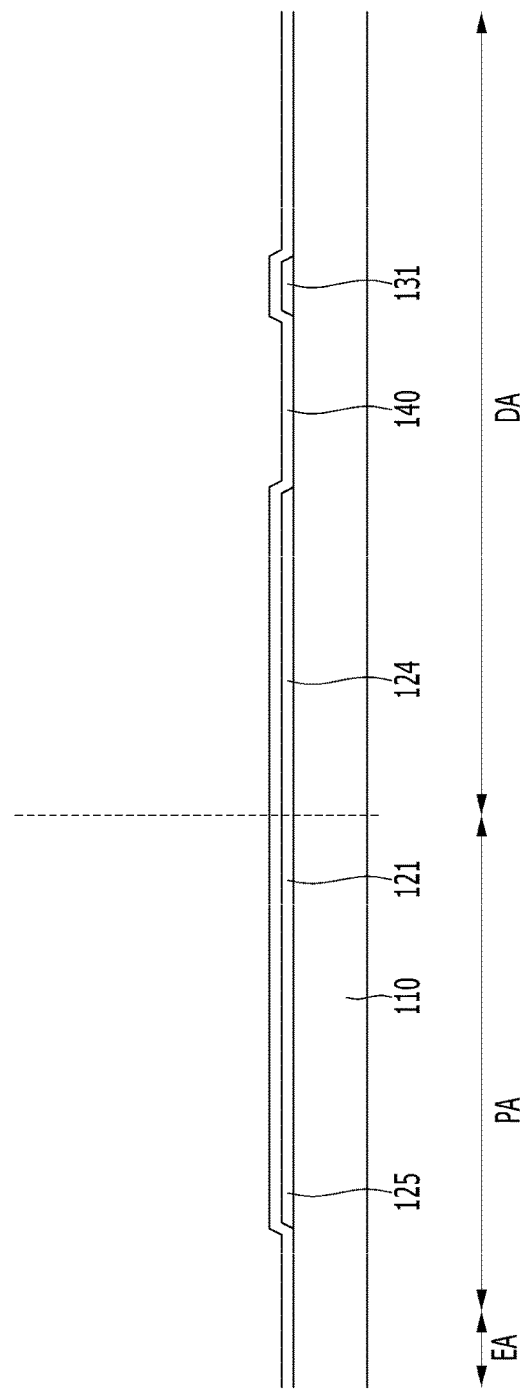
FIGS. 5 to 18 are process cross-sectional views of a manufacturing method of a display device, according to an exemplary embodiment.
Figure 6:
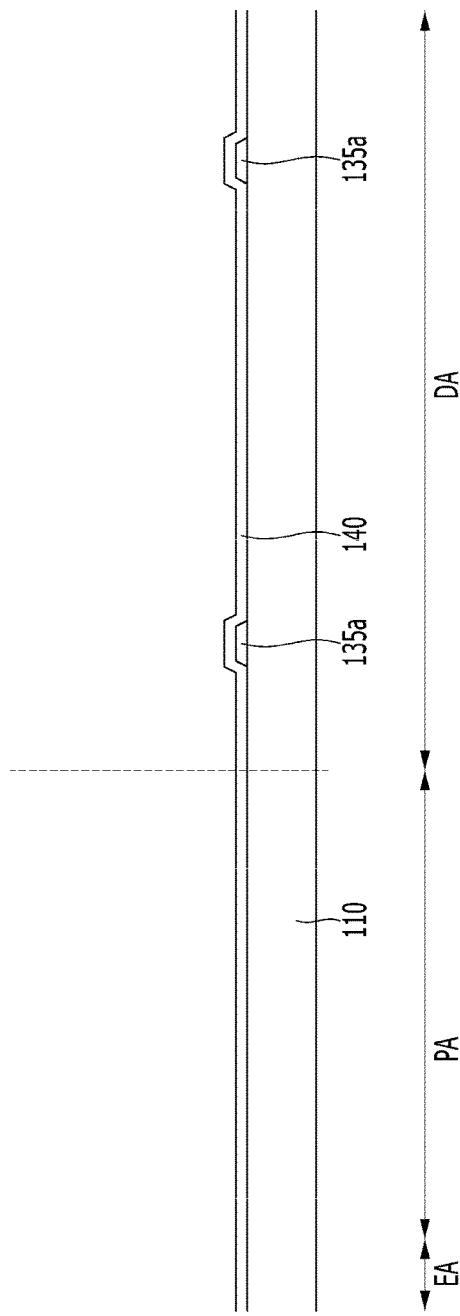

As shown in FIGS. 5 and 6, a gate line 121 extending in a first direction and a gate electrode 124 protruding from the gate line 121 are formed on a substrate 110 that is made of glass or plastic. For example, the gate line 121 may substantially extend in a horizontal direction.

In one embodiment, a gate pad 125 connected to the gate line 121 is formed together with the gate line 121 and gate electrode 124. The gate line 121 is extended from a display area DA to a peripheral area PA. The substrate 100 further includes an extra area EA on an outer edge of the peripheral area PA. The gate pad 125 is extended from an end portion of the gate line 121 and is positioned in the peripheral area PA. The gate pad 125 may be made of the same material as the gate line 121 and the gate electrode 124, and may be disposed on the same layer.

In addition, a reference voltage line 131 and storage electrodes 135a and 135b protruding from the reference voltage line 131 may be formed together to be separated from the gate line 121. The reference voltage line 131 extends in a direction parallel to the gate line 121. The storage electrodes 135a and 135b include a pair of first storage electrodes 135a extending substantially perpendicular to the reference voltage line 131, and a second storage electrode 135b connecting the pair of first storage electrodes 135a. The reference voltage line 131 and the storage electrodes 135a and 135b may surround a pixel electrode 191.

Next, using an inorganic insulating material such as a silicon nitride (SiNx) or a silicon oxide (SiOx), a gate insulating layer 140 is formed on the gate line 121, the gate electrode 124, the gate pad 125, the reference voltage line 131, and the storage electrodes 135a and 135b. The gate insulating layer 140 may include a single layer or multiple layers.

Figure 7:
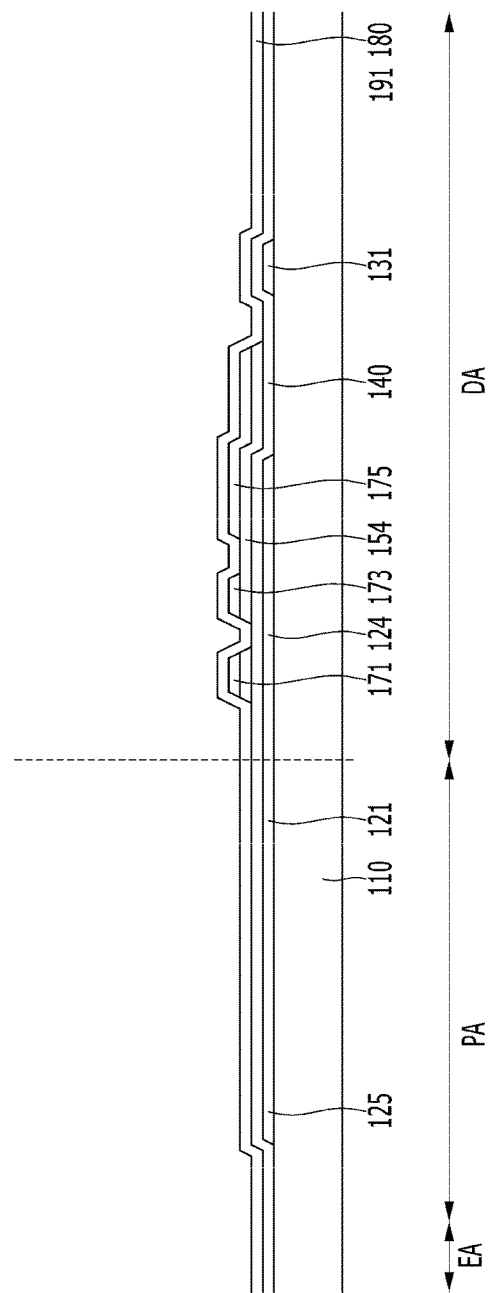
Figure 8:
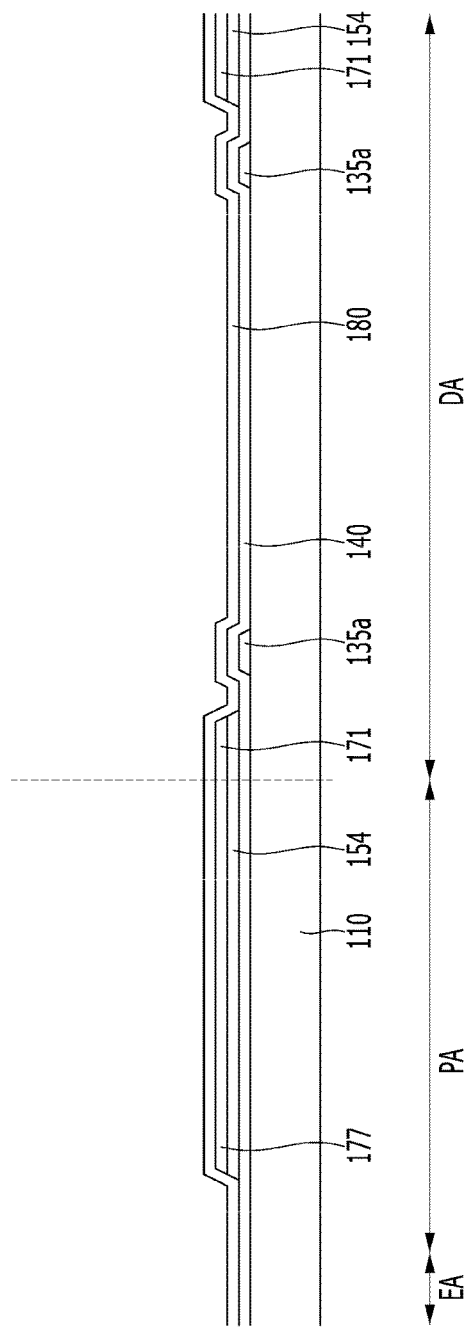

As shown in FIGS. 7 and 8, a semiconductor material such as amorphous silicon, polycrystalline silicon, or a metal oxide is deposited on the gate insulating layer 140. Next, a metal material is deposited. The metal material and the semiconductor material are patterned to form a semiconductor 154, a data line 171, a source electrode 173, a drain electrode 175, and a data pad 177. The data line 171, the source electrode 173, the drain electrode 175, and the data pad 177 may include a single layer or multiple layers.

The semiconductor 154 is positioned on the gate electrode 124 and under the data line 171. In the above description, the method in which the semiconductor material and the metal material are sequentially deposited and are then simultaneously patterned is described, but the present disclosure is not limited thereto. After the semiconductor material is deposited and then patterned such that the semiconductor 154 is formed first, the metal material may be deposited and then patterned to form the data line 171. In this case, the semiconductor 154 may not be positioned under the data line 171.

The data line 171 extends in a second direction to cross the gate line 121 and the reference voltage line 131. For example, the data line 171 may be extended in a substantially vertical direction. The source electrode 173 protrudes above the gate electrode 124 from the data line 171, and a part of the drain electrode 175 is surrounded by the source electrode 173. The data line 171, the source electrode 173, and the drain electrode 175 are positioned in the display area DA, and the data line 171 is extended to the peripheral area PA.

The data pad 177 is connected to the data line 171. The data pad 177 is extended from an end portion of the data line 171. The end portion of the data line 171 is positioned in the peripheral area PA, and the data pad 177 is positioned in the peripheral area PA. The data pad 177 may be made of the same material as and disposed on the same layer as the data line 171, the source electrode 173, and the drain electrode 175.

The gate electrode 124, the source electrode 173, and the drain electrode 175 form one thin film transistor (TFT) Q along with the semiconductor 154. The thin film transistor Q may function as a switching element that transmits a data voltage of the data line 171. In this case, a channel of the switching element is formed in the semiconductor 154 between the source electrode 173 and the drain electrode 175.

Next, a passivation layer 180 is formed on the data line 171, the source electrode 173, the drain electrode 175, and an exposed portion of the semiconductor 154. The passivation layer 180 may be made of an organic insulating material or an inorganic insulating material, and may include a single layer or multiple layers.

Figure 9:
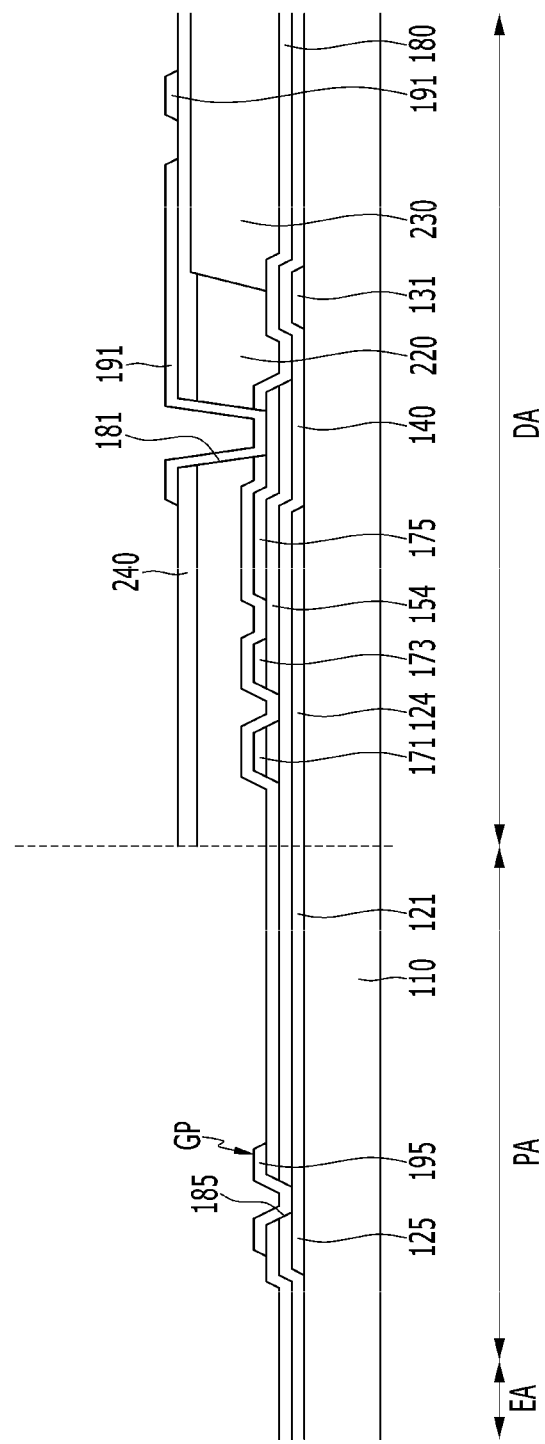
Figure 10:
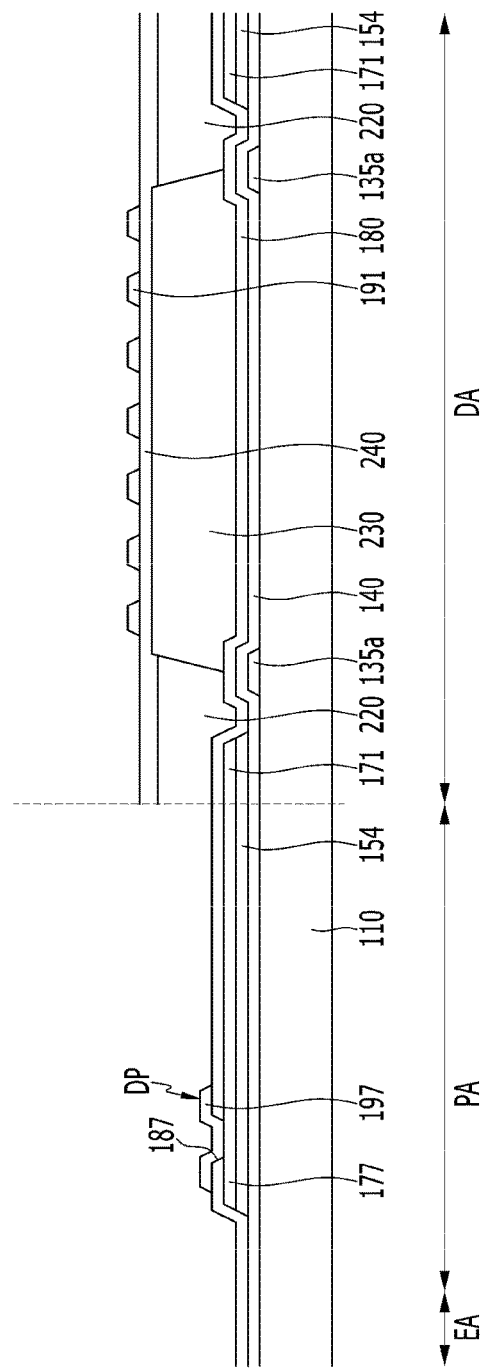

As shown in FIGS. 9 and 10, a color filter 230 is formed on the passivation layer 180. The color filter 230 may be formed inside each pixel, and may not be formed at an edge of the pixel. A plurality of color filters 230 allowing different wavelengths to be transmitted therethrough may be formed. In one embodiment, color filters 230 of the same color may be formed along a column direction. When forming color filters 230 of three colors, a color filter 230 of a first color may be formed first, a mask may be shifted to form a color filter 230 of a second color, and the mask may be further shifted to form a color filter of a third color.

Subsequently, a light blocking material is used to form a light blocking member 220 on the passivation layer 180. The light blocking member 220 may be positioned at the edge of the pixel, and may overlap the gate line 121, the data line 171, and the thin film transistor Q to prevent light leakage. However, the present disclosure is not limited thereto, and the light blocking member 220 may overlap the gate line 121 and the thin film transistor Q, but not the data line 171.

Next, a first insulating layer 240 is formed on the color filter 230 and the light blocking member 220. The first insulating layer 240 may be formed of an organic insulating material, and may serve to planarize top surfaces of the color filter 230 and the light blocking member 220. The first insulating layer 240 may be formed as a dual layer by sequentially depositing a layer made of an organic insulating material and a layer made of an inorganic insulating material.

Next, the first insulating layer 240, the light blocking member 220, and the passivation layer 180 are patterned to form a first contact hole 181 that exposes at least a portion of the drain electrode 175. In the forming of the first contact hole 181, a second contact hole 185 exposing at least a portion of the gate pad 125 and a third contact hole 187 exposing at least a portion of the data pad 177 may be formed together therewith.

Next, a transparent metal material such as an indium tin oxide (ITO) or an indium zinc oxide (IZO) is deposited on the first insulating layer 240 and then patterned to form the pixel electrode 191. The pixel electrode 191 is connected to the drain electrode 175 through the first contact hole 181. The pixel electrode 191 that has an overall quadrangular shape includes horizontal and vertical stem portions 193 and 192 crossing each other, and a minute branch portion 194 extending from the horizontal and vertical stem portions 193 and 192.

In one embodiment, a gate contact assistant 195 and a data contact assistant 197 are formed together therewith the pixel electrode 191. The gate contact assistant 195 is connected to the gate pad 125 through the second contact hole 185, and the data contact assistant 197 is connected to the data pad 177 through the third contact hole 187. The gate contact assistant 195 and the data contact assistant 197 may be made of the same material as and disposed on the same layer as the pixel electrode 191.

Figure 11:
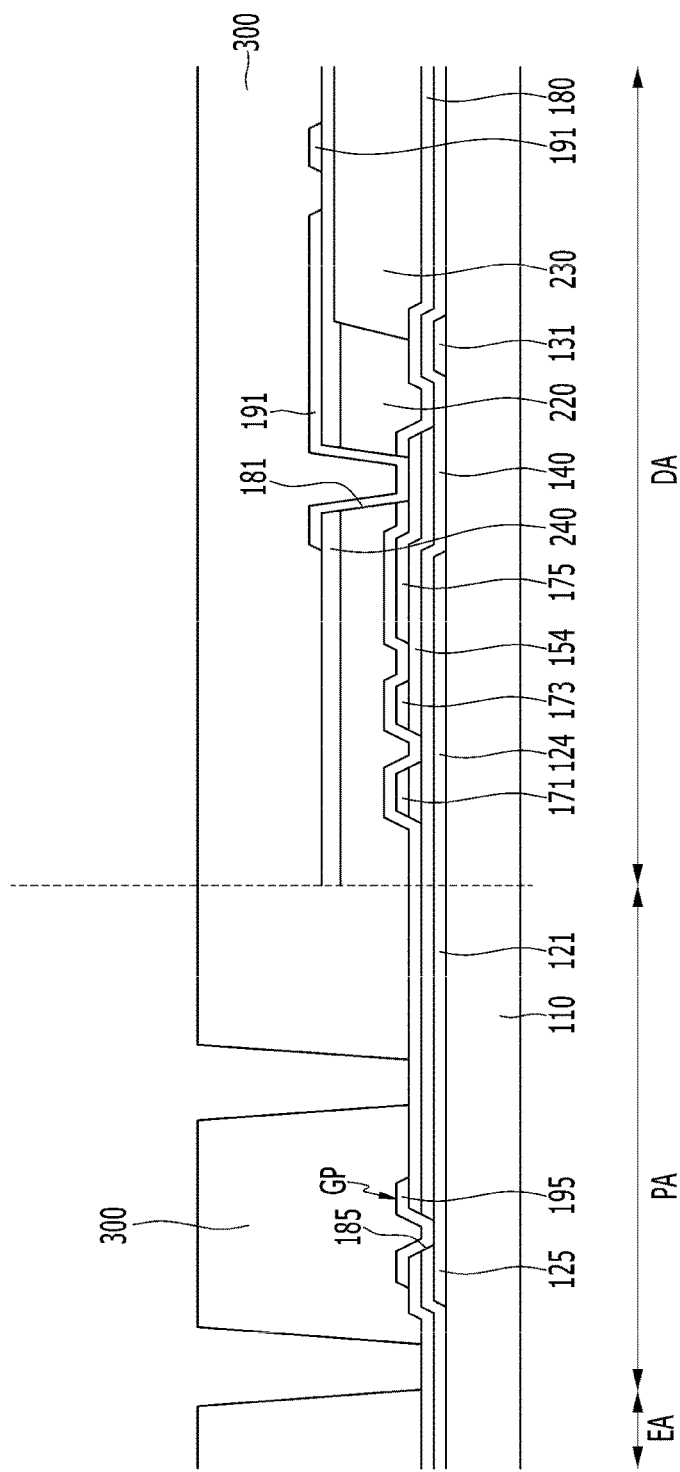
Figure 12:
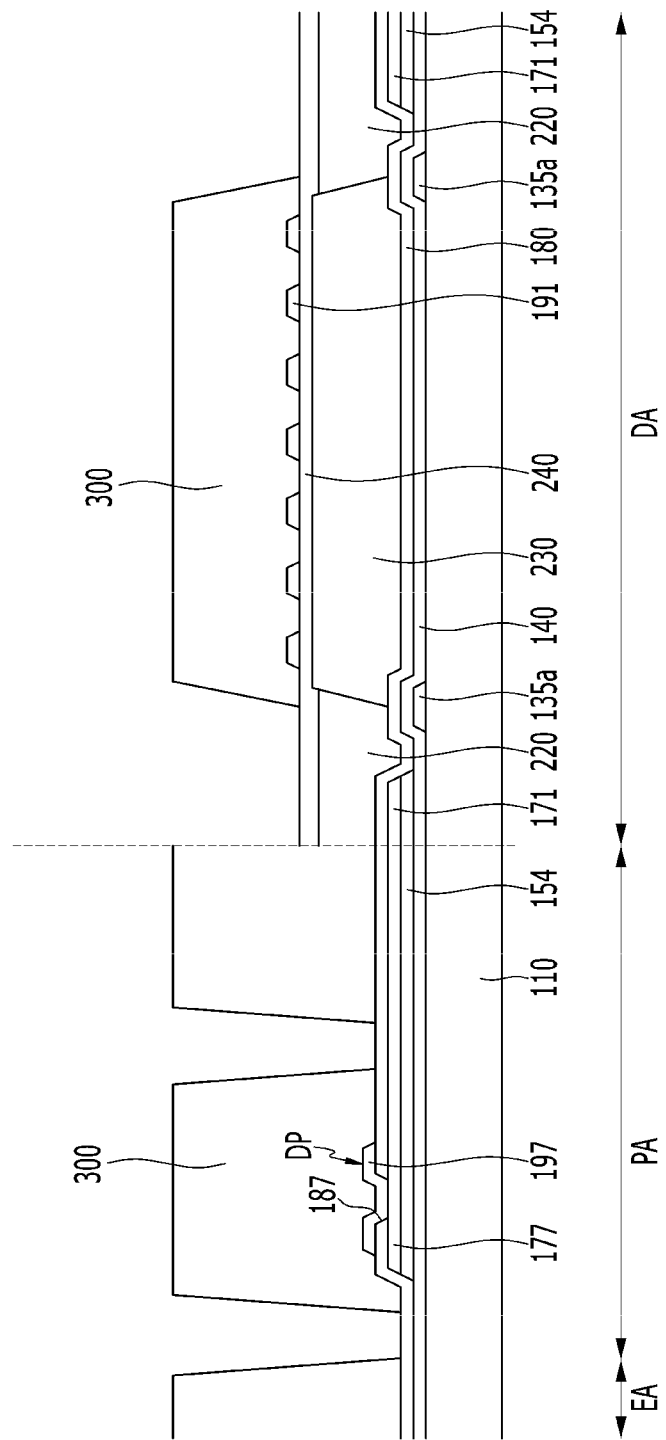

As shown in FIGS. 11 and 12, a sacrificial layer 300 is formed on the pixel electrode 191, the gate contact assistant 195, the data contact assistant 197, and the first insulating layer 240. In the top plan view, the sacrificial layer 300 may be formed to extend in the column direction. The sacrificial layer 300 may be formed in the display area DA and the peripheral area PA. In the display area DA, the sacrificial layer 300 may overlap the pixel electrode 191, but not the data line 171. In the peripheral area PA, the sacrificial layer 300 may overlap the gate contact assistant 195 and the data contact assistant 197.

Figure 13:
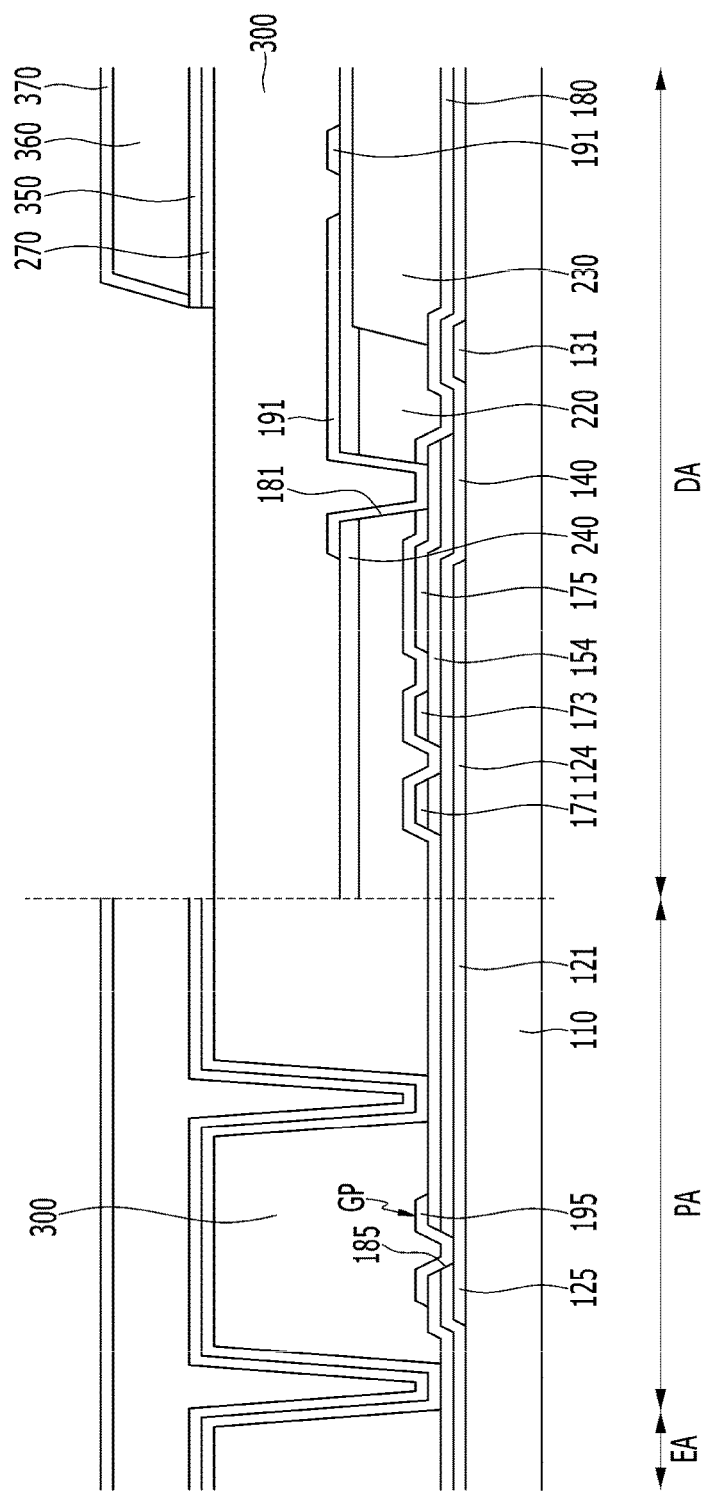
Figure 14:
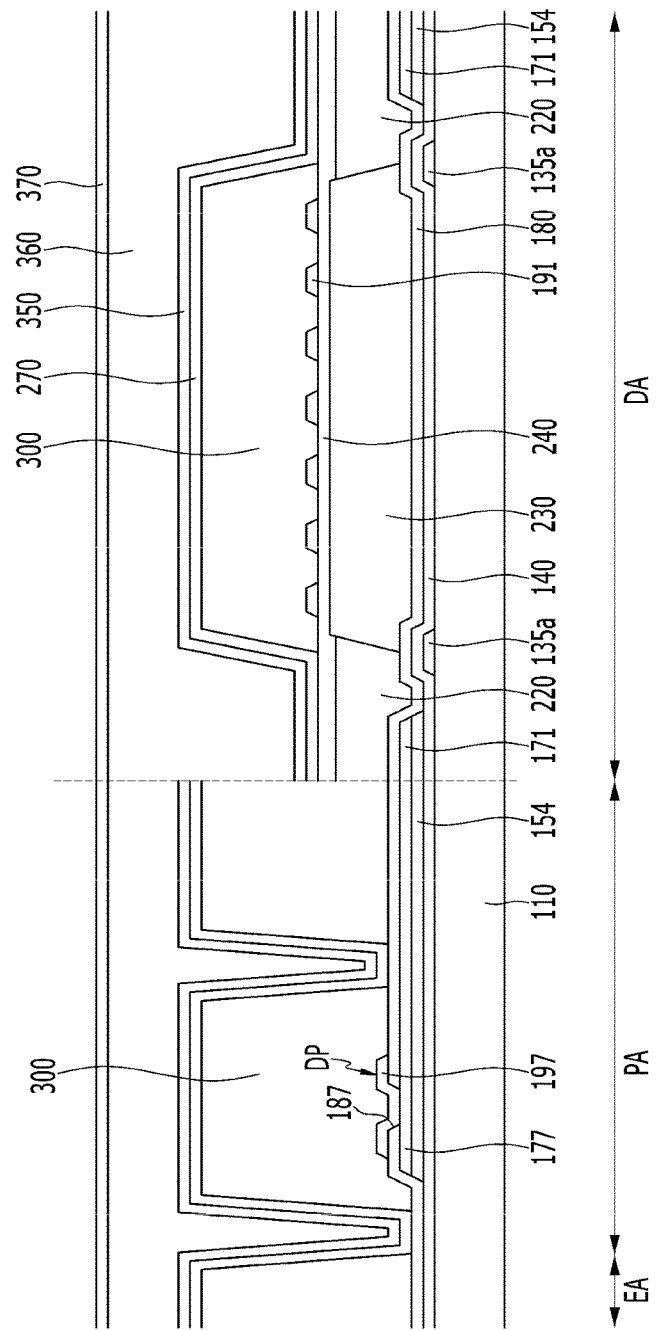

As shown in FIGS. 13 and 14, a transparent metal material such as an indium tin oxide (ITO) or an indium zinc oxide (IZO) is deposited on the sacrificial layer 300 to form a common electrode 270. A second insulating layer 350 may be formed on the common electrode 270 using an inorganic insulating material such as a silicon oxide or a silicon nitride. An organic material is coated on the second insulating layer 350 and is patterned to form a roof layer 360. In this case, the patterning may be performed such that an organic material positioned to overlap the gate line 121 and the thin film transistor Q is removed. Accordingly, the roof layer 360 may be extended along a row direction.

After the roof layer 360 is patterned, light is irradiated to the roof layer 360 to perform a curing process. The roof layer 360 is hardened after performing the curing process, and the roof layer 360 may maintain its shape even if a space is created under the roof layer 360.

Next, portions of the second insulating layer 350 and the common electrode 270 positioned to overlap the gate line 121 and the thin film transistor Q are removed by patterning the second insulating layer 350 and the common electrode 270 using the roof layer 360 as a mask.

Next, an inorganic insulating material such as a silicon nitride (SiNx) or a silicon oxide (SiOx) may be deposited on the roof layer 360 and patterned to form a third insulating layer 370. In one embodiment, the patterning may be performed such that the inorganic insulating material of the portions overlapping the gate line 121 and the thin film transistor Q is removed. The third insulating layer 370 may cover a top surface of the roof layer 360, and may further cover a side surface of the roof layer 360. As the roof layer 360, the second insulating layer 350, the common electrode 270, and the third insulating layer 370 are patterned, a portion of the sacrificial layer 300 is exposed to the outside.

Figure 15:
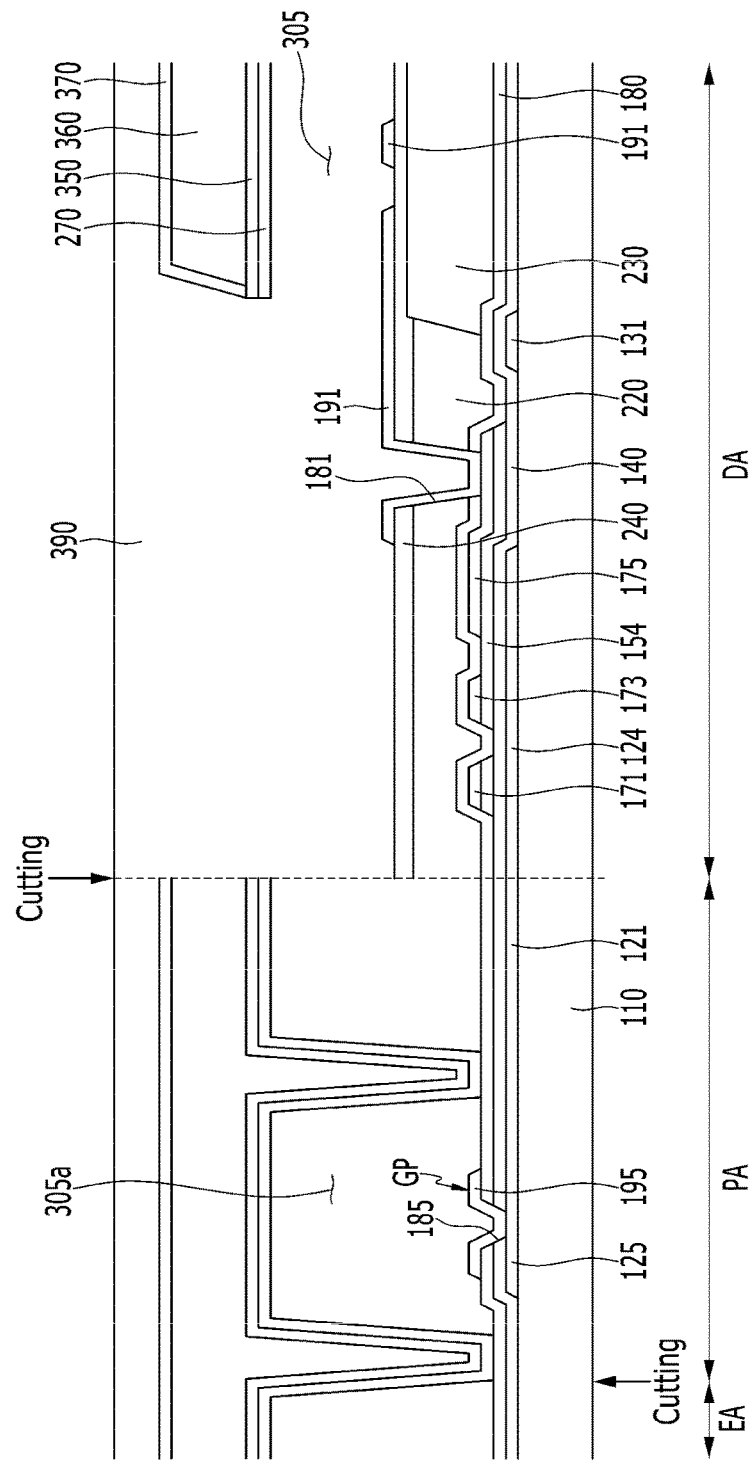
Figure 16:
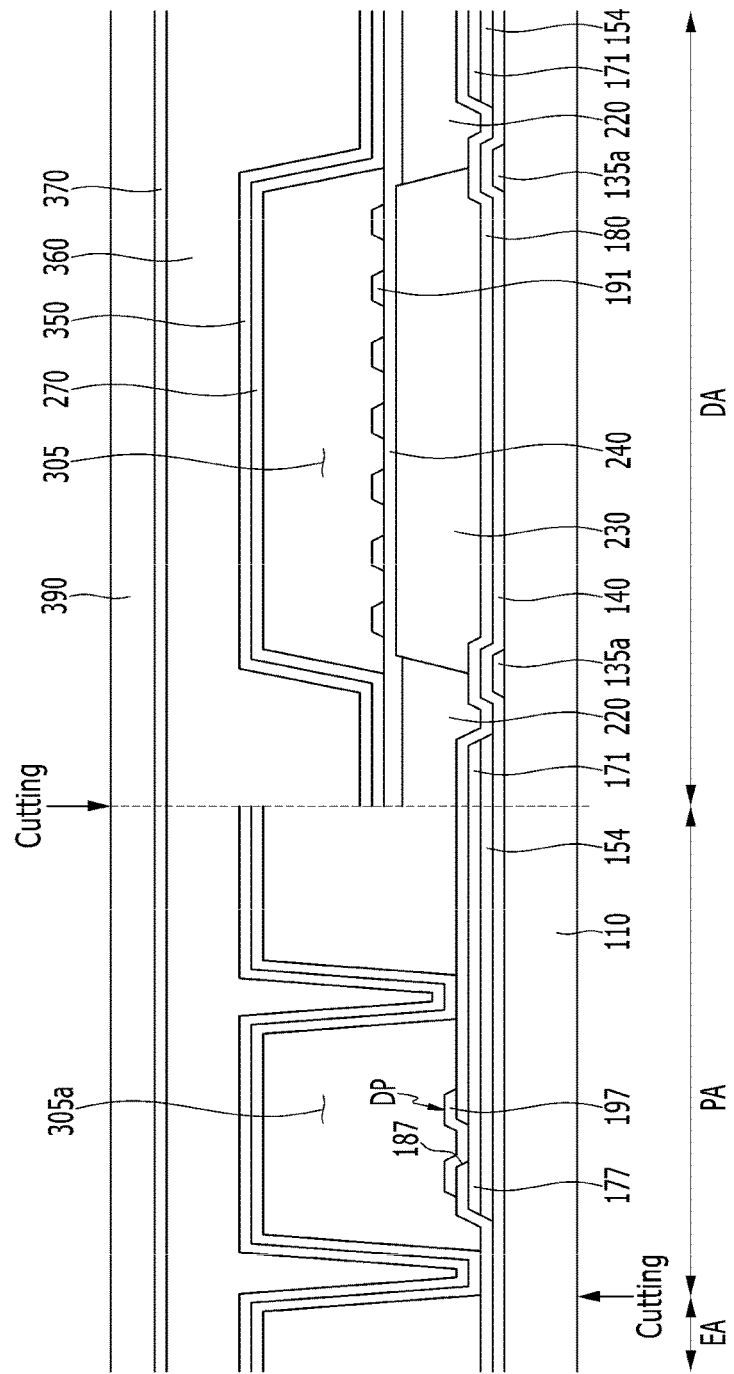

When a developer or a stripper solution is supplied on the sacrificial layer 300, or an ashing process is performed, the sacrificial layer 300 is completely removed, and a microcavity 305 and a dummy microcavity 305a, as shown in FIGS. 15 and 16, are created at the position where the sacrificial layer 300 was previously positioned. The microcavity 305 is positioned in the display area DA, while the dummy microcavity 305a is positioned in the peripheral area PA.

The pixel electrode 191 and the roof layer 360 are spaced apart from each other by the microcavity 305 that is interposed between the pixel electrode 191 and the roof layer 360. The gate contact assistant 195 and the roof layer 360 are spaced apart from each other by the microcavity 305 that is interposed between the gate contact assistant 195 and the roof layer 360. The data contact assistant 197 and the roof layer 360 are spaced apart from each other by the microcavity 305 that is interposed between the data contact assistant 197 and the roof layer 360. The roof layer 360 covers a top surface and a portion of a side surface of the microcavity 305, and covers a top surface and a portion of a side surface of the dummy microcavity 305a.

The microcavity 305 is exposed to the outside through portions where the roof layer 360 and the common electrode 270 are removed. The portions via which the microcavity 305 is exposed are referred to as injection openings 307a and 307b. The two injection openings 307a and 307b may be formed in one microcavity 305. For example, a first injection opening 307a exposing a side surface of a first edge of the microcavity 305, and a second injection opening 307b exposing a side surface of a second edge of the microcavity 305 may be formed. The first edge and the second edge may face each other. For example, the first edge may be an upper edge of the microcavity 305, while the second edge may be a lower edge of the microcavity 305.

Next, when an aligning agent containing an alignment material is dripped onto the substrate 110 using a spin coating method or an inkjet method, the aligning agent is injected into the microcavity 305 via the injection holes 307a and 307b. When a curing process is performed after the aligning agent is injected into the microcavity 305, a solution of the aligning agent is evaporated and the alignment material remains at inner wall surfaces of the microcavity 305.

Accordingly, a first alignment layer 11 may be formed on the pixel electrode 191, and a second alignment layer 21 may be formed under the common electrode 270. The first and second alignment layers 11 and 21 are formed to face each other while interposing the microcavity 305 therebetween. In some embodiments, the first and second alignment layers 11 and 21 are connected to each other at a side wall of the edge of the microcavity 305. In this case, the first and second alignment layers 11 and 21 may be aligned in a direction perpendicular to the substrate 110, except at the side surface of the microcavity 305.

Next, when an inkjet method or a dispensing method is used to drip a liquid crystal (LC) material onto the substrate 110, the LC material is injected through the injection openings 307a and 307b into the microcavity 305 by a capillary force. Accordingly, an LC layer including LC molecules 310 is formed inside the microcavity 305. The alignment layers 11 and 21 and the LC layer may not be formed in the dummy microcavity 305a.

Next, a material that does not react with the LC molecules 310 is deposited on the third insulating layer 370 to form an encapsulation layer 390. The encapsulation layer 390 is formed to cover the injection openings 307a and 307b and seal the microcavity 305, thereby preventing the LC molecules 310 formed inside the microcavity 305 from being leaked to the outside.

Figure 17:
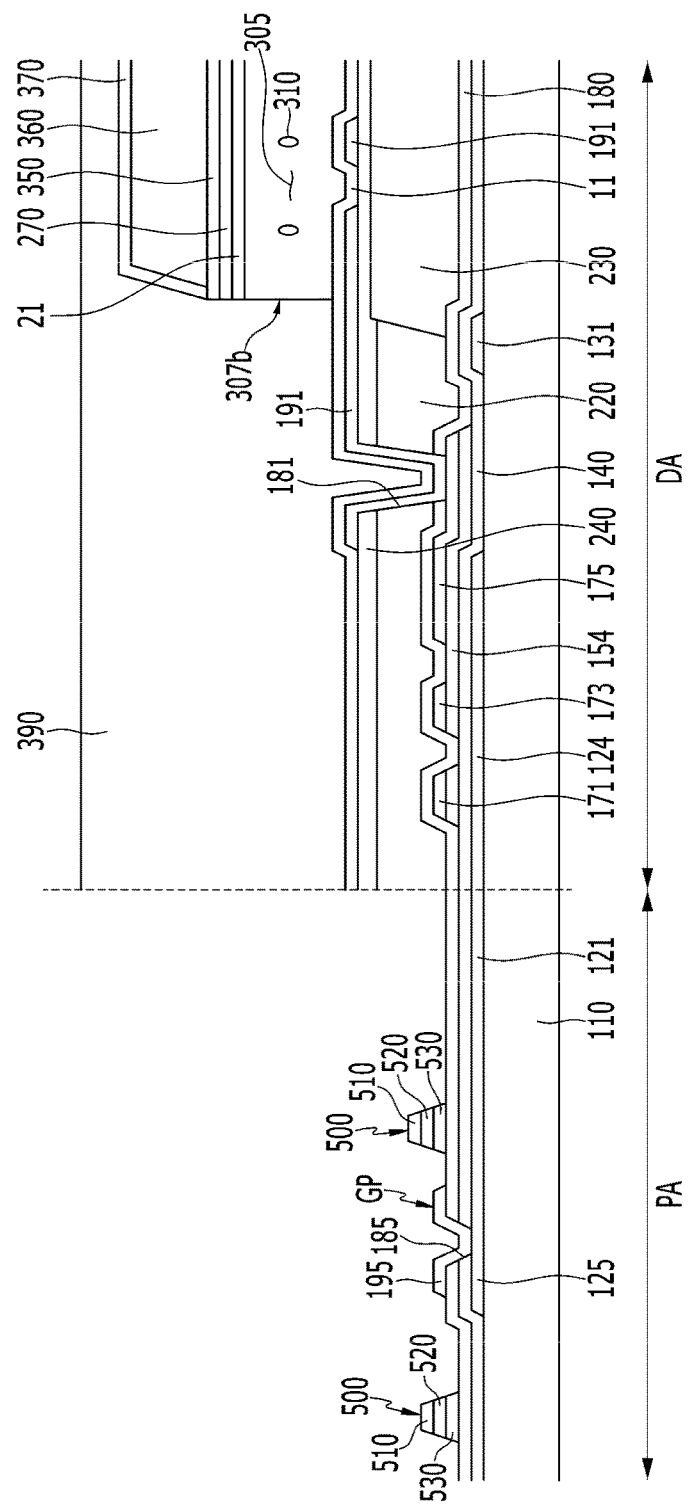
Figure 18:
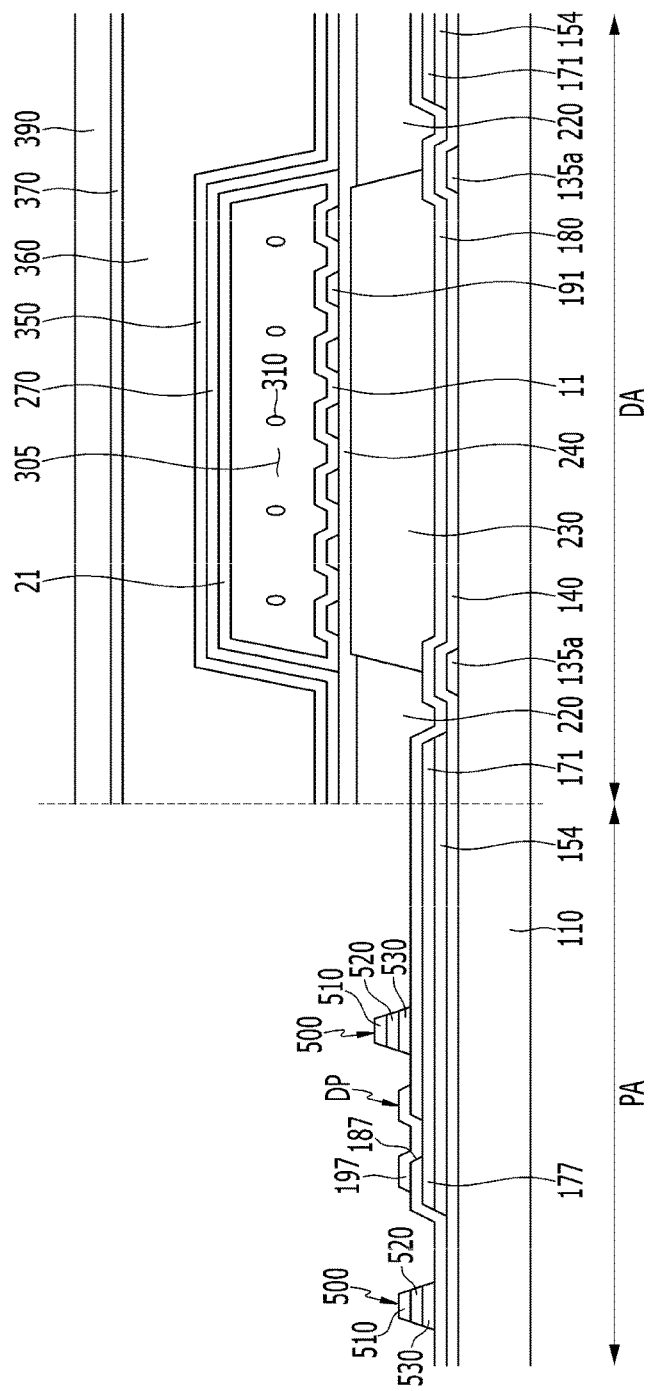

Next, the encapsulation layer 390 positioned on a boundary between the display area DA and the peripheral area PA of the substrate 110 is cut. In addition, the encapsulation layer 390 positioned on a boundary between the peripheral area PA and an extra area EA of the substrate 110 is cut. As such, after the encapsulation layer 390 and the substrate 110 are respectively cut, the encapsulation layer 390 positioned in the peripheral area PA, and the extra area EA is separated from the peripheral area PA. That is, the encapsulation layer 390 positioned in the peripheral area PA and the extra area EA of the substrate 110 is removed along with the extra area EA of the substrate 110, and as shown in FIGS. 17 and 18, and only the display area DA and the peripheral area PA of the substrate 110 remain. The encapsulation layer 390 remains only in the display area DA of the substrate 110.

In the cutting of the encapsulation layer 390, a laser may be irradiated to the encapsulation layer 390 that is positioned on the boundary between the display area DA and the peripheral area PA of the substrate 110. Due to the laser irradiation, a side surface of the encapsulation layer 390 may include a heat-deformable portion. A region to which a laser is irradiated does not overlap the gate pad portion GP and the data pad portion DP. Accordingly, damage to the gate contact assistant 195 or the data contact assistant 197 may be prevented. In addition, since a photolithography process is not performed, contamination of the LC layer may be prevented.

However, the present disclosure is not limited thereto, and the encapsulation layer 390 may be mechanically cut. For example, a half cutting method may be used to cut only the encapsulation layer 390 such that damage to the substrate 110 or the like positioned under the encapsulation layer 390 is prevented. In another example, a mechanical cutting method may be used to cut the substrate 110.

It is illustrated that the dummy microcavity 305a is positioned in a lower part of a region where the encapsulation layer 390 is cut, but the present disclosure is not limited thereto. The dummy microcavity 305a may not be positioned in the lower part of the region where the encapsulation layer 390 is cut, but may be covered only by the encapsulation layer 390.

During the removal of the encapsulation layer 390, the roof layer 360 positioned in the peripheral area PA of the substrate 110 partially remains to form a pillar 500. During the removal of the encapsulation layer 390, the roof layer 360 is divided into two parts, and one part is removed along with the encapsulation layer 390 while the other part remains on the substrate 110. The second insulating layer 350 and the common electrode 270 positioned under the roof layer 360 may remain together.

The pillar 500 may include a first layer 510, a second layer 520 positioned under the first layer 510, and a third layer 530 positioned under the second layer 520. The first layer 510 may be made of the same material as and disposed on the same layer as the roof layer 360. The first layer 510 may be formed to be thinner than the roof layer 360. The second layer 520 may be made of the same material as and disposed on the same layer as the second insulating layer 350. The third layer 530 may be made of the same material as and disposed on the same layer as the common electrode 270. The pillar 500 may include only the third layer 530, or may include only the third layer 530 and the second layer 520.

In the current exemplary embodiment, the dummy microcavity 305a is formed in the peripheral area PA and is then removed such that the gate pad portion GP and the data pad portion DP are opened. Since the encapsulation layer 390 is formed to be extended to the peripheral area PA and is then cut to be removed, the side surface of the encapsulation layer 390 may have a steep slope, thereby reducing a bezel area. In addition, since the dummy microcavity 305a is formed on the gate pad portion GP and the data pad portion DP and is then removed, the encapsulation layer 390 or the like may be easily removed, and damage to the gate pad portion GP and the data pad portion DP may be prevented.

Subsequently, although not illustrated, polarizing plates may be further attached to top and bottom surfaces of the display device. The polarizing plates may include a first polarizing plate and a second polarizing plate. The first polarizing plate may be attached to a bottom surface of the substrate 110, and the second polarizing plate may be attached to the encapsulation layer 390.

Next, referring to FIGS. 19 to 21, a display device according to an exemplary embodiment will be described as follows. Since the display device according to the current exemplary embodiment illustrated in FIG. 19 to FIG. 21 has substantially the same configuration as the display device according to the exemplary embodiment illustrated in FIGS. 1 to 4, a description thereof may be omitted. The exemplary embodiment illustrated in FIGS. 19 to 20 differs from the aforementioned exemplary embodiment in that a pillar does not include a layer that is made of the same material as a common electrode, and will be described below in detail.

Figure 19:
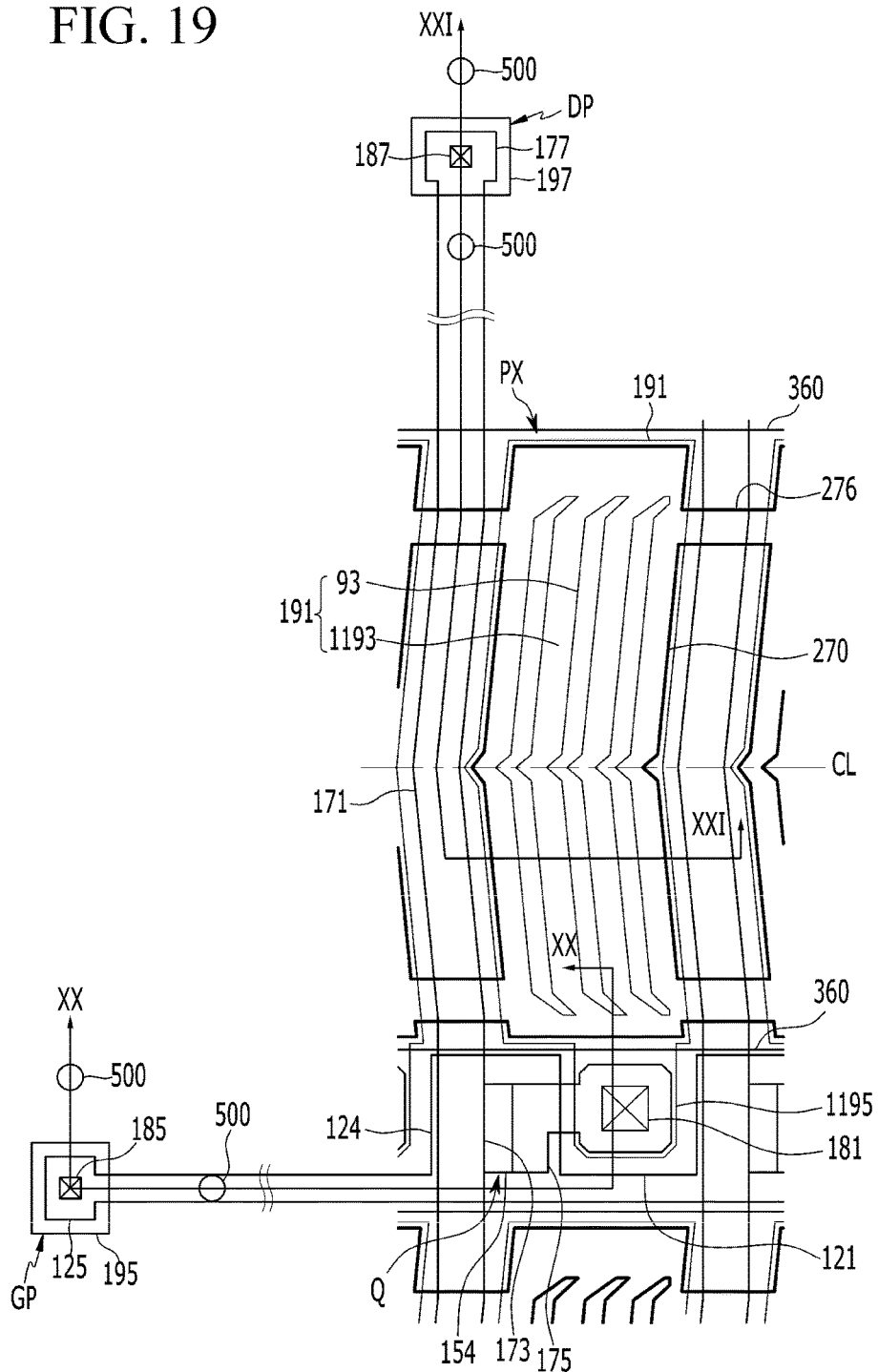
FIG. 19 is a partial top plan view of a display device, according to an exemplary embodiment.

FIG. 19 is a partial top plan view of a display device, according to an exemplary embodiment. FIG. 20 is a cross-sectional view of the display device, according to the exemplary embodiment taken along the line XX-XX of FIG. 19. FIG. 21 is a cross-sectional view of the display device, according to the exemplary embodiment taken along the line XXI-XXI of FIG. 19.

Figure 20:
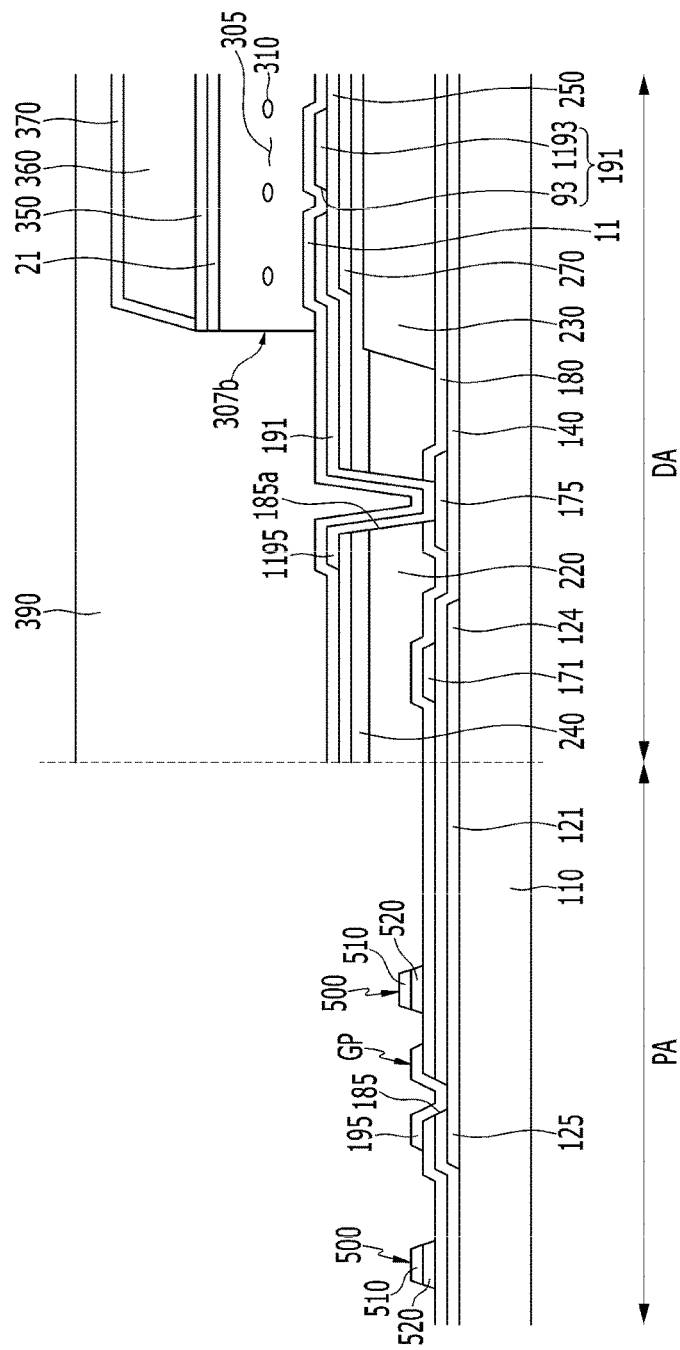
FIG. 20 is a cross-sectional view of the display device taken along the line XX-XX of FIG. 19.
Figure 21:
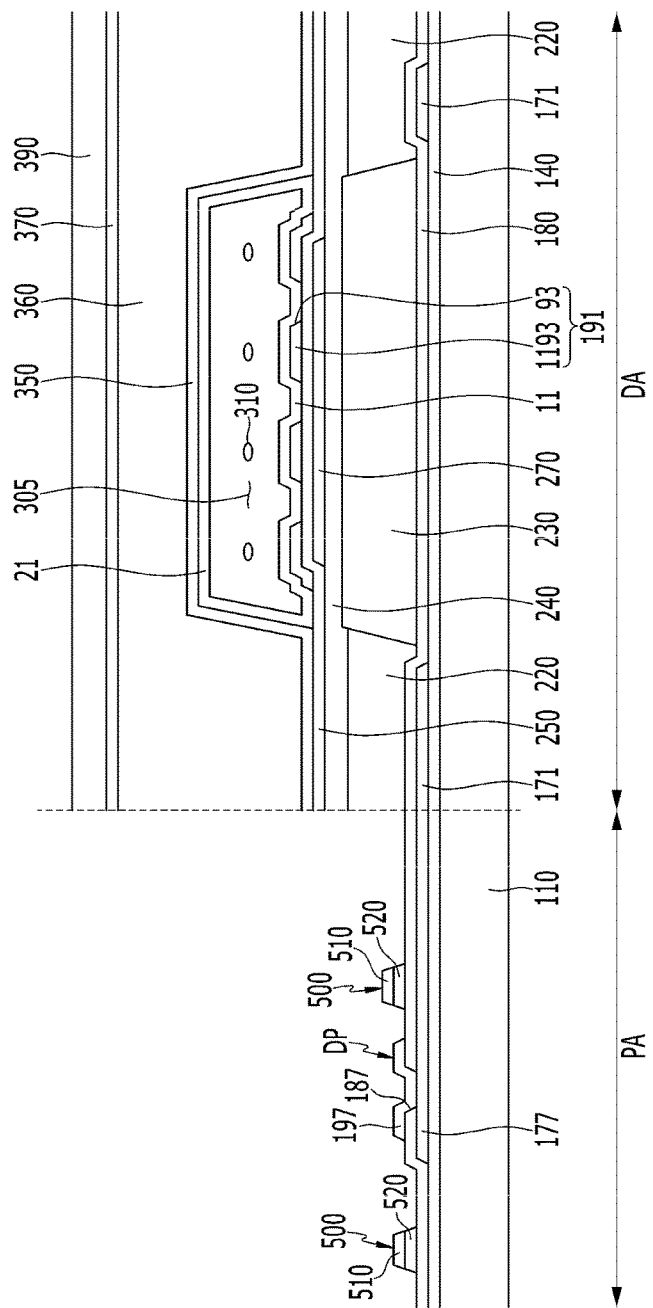
FIG. 21 is a cross-sectional view of the display device taken along the line XXI-XXI of FIG. 19.

Referring to FIGS. 19 to 21, the current exemplary embodiment is the same as the aforementioned exemplary embodiment in that a thin film transistor Q including a gate electrode 124, a source electrode 173, a drain electrode 175, and a semiconductor 154 is formed on a display area DA of a substrate 110. In addition, a gate pad 125 and a data pad 177 are formed on a peripheral area PA of the substrate 110.

A common electrode 270 is formed on a first insulating layer 240. In the aforementioned exemplary embodiment, the common electrode 270 is positioned on the microcavity 305, but in the current exemplary embodiment, the common electrode 270 is positioned under a microcavity 305.

The common electrodes 270 positioned inside a plurality of pixels PX may be connected to each other via a connecting bridge 276 or the like, and may transmit substantially the same voltage. The common electrode 270 positioned inside each pixel PX may have a planar shape. The common electrode 270 may be made of a transparent metal oxide such as an indium tin oxide (ITO) or an indium zinc oxide (IZO).

An interlayer insulating layer 250 is formed on the common electrode 270. The interlayer insulating layer 250 may be made of an inorganic insulating material such as a silicon nitride (SiNx) or a silicon oxide (SiOx).

A first contact hole 181 exposing at least a portion of the drain electrode 175 is formed in the interlayer insulating layer 250, the first insulating layer 240, a light blocking member 220, and a passivation layer 180. In addition, a second contact hole 185 exposing at least a portion of the gate pad 125 is formed in the passivation layer 180 and a gate insulating layer 140, and a third contact hole 187 exposing at least a portion of the data pad 177 is formed in the passivation layer 180.

A pixel electrode 191 is formed on the interlayer insulating layer 250. The pixel electrode 191 may include a plurality of branch electrodes 1193 and a slit 93 positioned between the plurality of branch electrodes 1193. The plurality of branch electrodes 1193 and the slit 93 of the pixel electrode 191 overlap the common electrode 270. The pixel electrode 191 and the common electrode 270 are separated by the interlayer insulating layer 250. The interlayer insulating layer 250 serves to insulate the pixel electrode 191 from the common electrode 270.

The pixel electrode 191 may include a protruding portion 1195 for connection with a different layer. The protruding portion 1195 of the pixel electrode 191 is physically and electrically coupled to the drain electrode 175 through the first contact hole 181 such that it is applied with a voltage from the drain electrode 175. The pixel electrode 191 may be made of a transparent metal oxide such as an indium tin oxide (ITO) or an indium zinc oxide (IZO).

The pixel electrode 191 may include a curved side that is curved along a curved shape of the data line 171. For example, the pixel electrode 191 may have a polygonal shape that includes a side that is bent at least once from a portion corresponding to a horizontal center line CL of the pixel PX.

In addition, a gate contact assistant 195 and a data contact assistant 197 are positioned in the peripheral area PA of the substrate 110. The gate contact assistant 195 and the data contact assistant 197 may be disposed on the passivation layer 180.

The gate contact assistant 195 is connected to the gate pad 125 through the second contact hole 185. The gate contact assistant 195 may be made of the same material as and disposed on the same layer as the pixel electrode 191. The gate pad 125 and the gate contact assistant 195 are laminated to form a gate pad portion GP.

The data contact assistant 197 is connected to the data pad 177 through the third contact hole 187. The data contact assistant 197 may be made of the same material as and disposed on the same layer as the pixel electrode 191. The data pad 177 and the data contact assistant 197 are laminated to form a data pad portion DP.

The layout of the pixel and the shape of the thin film transistor that are described above may be variously modified. In addition, the pixel electrode 191 and the common electrode 270 may switch their positions with respect to each other when they are sequentially laminated. In the above description, it is described that the interlayer insulating layer 250 is formed on the common electrode 270, and the pixel electrode 191 is formed on the interlayer insulating layer 250. On the contrary, the interlayer insulating layer may be formed on the pixel electrode, and the common electrode may be formed on the interlayer insulating layer. Alternatively, the pixel electrode 191 may have a planar shape, and the common electrode 270 may include the branch electrodes and the slit.

A roof layer 360 is formed on the pixel electrode 191 to be spaced apart from the pixel electrode 191 by a predetermined distance. The microcavity 305 is formed between the pixel electrode 191 and the roof layer 360. The microcavity 305 is surrounded by the pixel electrode 191 and the roof layer 360.

Alignment layers 11 and 21 are formed above the pixel electrode 191 and under the roof layer 360. The alignment layers may be horizontal alignment layers.

A liquid crystal (LC) layer containing LC molecules 310 is formed inside the microcavity 305 that is positioned between the pixel electrode 191 and the roof layer 360. The LC molecules 310 may have positive dielectric anisotropy or negative dielectric anisotropy. For example, the LC molecules 310 may be aligned such that their long axes are disposed parallel to the substrate 110 when no electric field is present. That is, horizontal alignment may be achieved.

A pillar 500 is positioned in the peripheral area PA of the substrate 110. The pillar 500 may be disposed on the passivation layer 180. The pillar 500 may include a single layer or multiple layers. For example, the pillar 500 may include a first layer 510, and a second layer 520 positioned under the first layer 510. The first layer 510 may be made of the same material as and disposed on the same layer as the roof layer 360. The first layer 510 may be formed to be thinner than the roof layer 360. The second layer 520 may be made of the same material as and disposed on the same layer as the second insulating layer 350. The pillar 500 may include only the second layer 520.

It is illustrated that the pillar 500 does not overlap the gate pad portion GP and the data pad portion DP. However, the present disclosure is not limited thereto, and the pillar 500 may overlap a portion of the gate pad portion GP and the data pad portion DP.

A third insulating layer 370 is positioned on the roof layer 360, and an encapsulation layer 390 is formed on the third insulating layer 370. The encapsulation layer 390 may encapsulate the microcavity 305.

The encapsulation layer 390 is positioned in the display area DA, and is not positioned in the peripheral area PA. Accordingly, the gate pad portion GP and the data pad portion DP may not be covered by the encapsulation layer 390, but may be exposed.

As in the aforementioned exemplary embodiment, a dummy microcavity may be formed on the gate pad portion GP and the data pad portion DP, and the encapsulation layer 390 and the substrate 110 may be respectively cut to remove the encapsulation layer 390 positioned in the peripheral area PA of the substrate 110, thereby allowing the gate pad portion GP and the data pad portion DP to be opened. In this case, damage to the gate pad portion GP and the data pad portion DP may be prevented.

While the present disclosure has been described in connection with exemplary embodiments, it is to be understood that the present disclosure is not limited to the disclosed embodiments, but, on the contrary, is intended to cover various modifications and equivalent arrangements included within the spirit and scope of the present disclosure.

DESCRIPTION OF SYMBOLS

| | |
|---|---|
| 110: substrate | 121: gate line |
| 125: gate pad | 171: data line |
| 177: data pad | 191: pixel electrode |
| 195: gate contact assistant | 197: data contact assistant |
| 270: common electrode | 300: sacrificial layer |
| 305: microcavity | 305a: dummy microcavity |
| 310: LC molecule | 360: roof layer |
| 390: encapsulation layer | 500: pillar |
| 510: first layer | 520: second layer |
| 530: third layer | GP: gate pad portion |
| DP: data pad portion | |

What is claimed is:

1. A manufacturing method of a display device comprising:
   forming a thin film transistor in a display area of a substrate including a display area, a peripheral area, and an extra area;
   forming a first electrode to be connected to the thin film transistor;
   forming a sacrificial layer on the first electrode;
   forming a roof layer on the sacrificial layer;
   forming a microcavity between the first electrode and the roof layer by removing the sacrificial layer;
   forming an encapsulation layer on the roof layer;
   cutting the encapsulation layer positioned on a boundary between the display area and peripheral area of the substrate;
   cutting a boundary between the peripheral area and extra area of the substrate; and
   removing the encapsulation layer positioned in the peripheral area and extra area of the substrate, and the extra area of the substrate.

2. The manufacturing method of claim 1, further comprising:
   forming a gate line on the substrate; and
   forming a data line on the substrate,
   wherein the gate line and the data line are connected to the thin film transistor.

3. The manufacturing method of claim 2, further comprising:
   forming, in the peripheral area of the substrate, a gate pad portion connected to the gate line; and forming, in the peripheral area of the substrate, a data pad portion connected to the data line.

4. The manufacturing method of claim 3, further comprising:
forming the sacrificial layer on the gate pad portion and the data pad portion; and
forming a dummy microcavity.

5. The manufacturing method of claim 4, further comprising:
removing the dummy microcavity; and
forming a pillar in the peripheral area of the substrate.

6. The manufacturing method of claim 5, wherein the pillar includes a first layer that is made of the same material as the roof layer.

7. The manufacturing method of claim 6, further comprising:
forming a second electrode on the sacrificial layer; and
forming an insulating layer on the second electrode, wherein the pillar further includes:
a second layer that is positioned under the first layer and is made of the same material as the insulating layer, and
a third layer that is positioned under the second layer and is made of the same material as the second electrode.

8. The manufacturing method of claim 6, further comprising:
forming a second electrode;
forming an interlayer insulating layer interposed between the first electrode and the second electrode; and
forming an insulating layer on the sacrificial layer, wherein the pillar further includes:
a second layer that is positioned under the first layer and is made of the same material as the insulating layer.

9. The manufacturing method of claim 3, wherein the forming of the gate pad portion includes:
forming a gate pad extended from an end portion of the gate line; and
forming a gate contact assistant on the gate pad.

10. The manufacturing method of claim 9, wherein the gate pad is made of the same material as the gate line, and
the gate contact assistant is made of the same material as the first electrode.

11. The manufacturing method of claim 3, wherein the forming of the data pad portion includes:
forming a data pad extended from an end portion of the data line, and
forming a data contact assistant on the data pad.

12. The manufacturing method of claim 11, wherein the data pad is made of the same material as the data line, and
the data contact assistant is made of the same material as the first electrode.

13. The manufacturing method of claim 1, further comprising:
irradiating a laser to the encapsulation layer positioned on a boundary between the display area and peripheral area of the substrate to cut the encapsulation layer.

14. The manufacturing method of claim 13, wherein a region to which a laser is irradiated does not overlap the gate pad portion or the data pad portion.

15. The manufacturing method of claim 13, wherein a side surface of the encapsulation layer includes a heat-deformable portion.

* * * * *